(12) United States Patent
Block et al.

(10) Patent No.: US 11,908,094 B2
(45) Date of Patent: *Feb. 20, 2024

(54) THREE-DIMENSIONAL CONVERSION OF A DIGITAL FILE SPATIALLY POSITIONED IN A THREE-DIMENSIONAL VIRTUAL ENVIRONMENT

(71) Applicant: Sagan Works, Inc., Ann Arbor, MI (US)

(72) Inventors: Erika Block, Ann Arbor, MI (US); Simon McCluskey, Ann Arbor, MI (US); Donald Hicks, Ann Arbor, MI (US)

(73) Assignee: Sagan Works, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,240

(22) Filed: May 17, 2021

(65) Prior Publication Data

US 2021/0272379 A1    Sep. 2, 2021

Related U.S. Application Data

(63) Continuation of application No. 16/508,897, filed on Jul. 11, 2019, now Pat. No. 11,010,984.

(Continued)

(51) Int. Cl.
*G06T 19/20* (2011.01)
*G06F 3/04815* (2022.01)

(Continued)

(52) U.S. Cl.
CPC .......... *G06T 19/20* (2013.01); *G06F 3/04815* (2013.01); *G06F 16/116* (2019.01);

(Continued)

(58) Field of Classification Search
CPC ............. G06T 19/20; G06T 2219/2004; G06F 3/04815; G06F 16/116; G06F 16/168

See application file for complete search history.

(56) References Cited

U.S. PATENT DOCUMENTS

| | | | | |
|---|---|---|---|---|
| 5,555,354 A | * | 9/1996 | Strasnick | G06F 3/04815 345/428 |
| 6,097,393 A | * | 8/2000 | Prouty, IV | G06F 3/04815 715/848 |

(Continued)

OTHER PUBLICATIONS

Pakanen et al. Studying Four 3D Gui Metaphors in Virtual Environment in Tablet Context, ACHI 2013: The Sixth International Conference on Advances in Computer-Human Interaction (Year: 2013).*

(Continued)

*Primary Examiner* — Yingchun He
(74) *Attorney, Agent, or Firm* — Taft Stettinius & Hollister LLP

(57) ABSTRACT

Systems and methods include transforming a digital file into a three-dimensional object that is spatially positioned in a three-dimensional virtual environment to visually organize the digital file relative to the three-dimensional virtual environment. Embodiments of the present disclosure relate to receiving the digital file that includes digital file parameters and is in a file format. The digital file is transforming into the three-dimensional object based on the digital file parameters associated with the digital file. The three-dimensional object is representative of the presentation of the digital file when executed by the computing device. The three-dimensional object is spatially positioned at a spatial location in the three-dimensional environment based on the digital file parameters of the digital file. A user is enabled to engage the three-dimensional object as spatially positioned in the three-dimensional virtual environment so that the (Continued)

three-dimensional object is executed in the three-dimensional virtual environment.

20 Claims, 9 Drawing Sheets

Related U.S. Application Data

(60) Provisional application No. 62/857,436, filed on Jun. 5, 2019.

(51) Int. Cl.
   *G06F 16/16* (2019.01)
   *G06F 16/11* (2019.01)

(52) U.S. Cl.
   CPC .... *G06F 16/168* (2019.01); *G06T 2219/2004* (2013.01); *G06T 2219/2016* (2013.01)

(56) References Cited

U.S. PATENT DOCUMENTS

| | | | |
|---|---|---|---|
| 6,362,817 | B1 | 3/2002 | Powers et al. |
| 6,938,218 | B1* | 8/2005 | Rosen ................. G06F 3/04815 715/848 |
| 7,788,323 | B2 | 8/2010 | Greenstein et al. |
| 8,132,121 | B2* | 3/2012 | Risch ..................... G06F 16/34 715/848 |
| 8,434,027 | B2 | 4/2013 | Jones |
| 10,431,003 | B2* | 10/2019 | Rogers ................. G06T 19/006 |
| 2005/0030309 | A1 | 2/2005 | Gettman et al. |
| 2009/0147003 | A1 | 6/2009 | Do et al. |
| 2010/0275018 | A1 | 10/2010 | Pedersen |
| 2011/0169927 | A1 | 7/2011 | Mages et al. |
| 2011/0176179 | A1 | 7/2011 | Judelson |
| 2012/0106785 | A1 | 5/2012 | Karafin et al. |
| 2013/0124156 | A1* | 5/2013 | Wolper ................. G06T 17/00 703/1 |
| 2018/0308289 | A1* | 10/2018 | Srinivasan .......... G06F 3/04815 |

OTHER PUBLICATIONS

International Preliminary Report on Patentability; International Searching Authority; International Application No. PCT/US2020/036406; dated Dec. 16, 2021; 25 pages.

International Search Report; International Searching Authority; International Application No. PCT/US2020/036406; dated Aug. 28, 2020; 2 pages.

Written Opinion of the International Searching Authority, International Searching Authority; International Application No. PCT/US2020/036406; dated Aug. 28, 2020; 24 pages.

Extended European Search Report; European Patent Office; European Application No. 20818561.1; dated Feb. 10, 2023; 7 pages.

Agarawala et al., "Keepin' it real", Proceedings of the Sigchi Conference on Human Factors in Computing Systems, Chi '06, ACM Press, New York, New York, USA, Apr. 22, 2006, pp. 1283-1292.

Friedman, "First Look: BumpTop Mac", Macworld, Jan. 21, 2010, Retrieved from the Internet: URL:https://www.macworld.com/article/1145812/firstlook_bumptop.html.

* cited by examiner

THREE-DIMENSIONAL CONVERSION OF A DIGITAL FILE SPATIALLY POSITIONED IN A THREE-DIMENSIONAL VIRTUAL ENVIRONMENT

CROSS-REFERENCE TO RELATED APPLICATIONS

The present application is a continuation application of U.S. Nonprovisional application Ser. No. 16/508,897 filed on Jul. 11, 2019 which claims the benefit of U.S. Provisional Application No. 62/857,436 filed on Jun. 5, 2019, which are incorporated herein by reference in its entirety.

BACKGROUND

Conventional digital file management requires that each digital file is saved in a location that typically organizes the saved digital files in a hierarchy of file folders. In doing so, the user is required to navigate through the hierarchy of file folders stored at the specific location as well as the numerous digital files saved in each of the file folders to identify the digital file that the user requests to execute. Often times such navigation of the hierarchy of file folders is a cumbersome task for the user in that the user is required to recall the specific file folder that the digital file is saved as well as the file name of the digital file in order to adequately identify the digital file from the numerous digital files to execute the digital file.

Further, users typically save digital files in numerous different locations depending on the device and/or navigation method that the users are incorporating when saving the digital files. For example, the user typically saves work related documents on the user's work computer and are stored in a hierarchy of file folders. The user may then save personal related documents on the smart phone that the user typically incorporates for personal use. However, the user may also save personal digital files on the user's work computer thereby complicating the navigation of determining where the personal digital files are stored. Additionally, navigating significant quantities of documents such as digital pictures, work documents and so on stored on a cloud based storage device is also significantly difficult to navigate and identify as to which digital files are stored where. Such difficulty in navigating the location of numerous digital files introduces significant inefficiency and is a daunting task.

BRIEF SUMMARY

Embodiments of the present disclosure relate to a system that transforms digital files into three-dimensional objects such that the three-dimensional objects have a visual context in a three-dimensional virtual environment as the information included in the digital files and enables a user to organize the three-dimensional objects in a manner to better navigate the information transformed from the digital files into the three-dimensional objects. A three-dimensional conversion digital file system may be implemented to transform a digital file into a three-dimensional object that is spatially positioned in a three-dimensional virtual environment to visually organize the digital file relative to the three-dimensional virtual environment. The system includes at least one processor and a memory coupled with the processor. The memory including instructions that when executed by the processor cause the processor to receive the digital file that includes a plurality of digital file parameters and is in a file format that is encoded for storage in a digital storage medium that the digital file is previously stored. The digital file parameters are indicative as to a presentation of the digital file when executed by a computing device. The processor is configured to transform the digital file into the three-dimensional object based on the digital file parameters associated with the digital file. The three-dimensional object is representative of the presentation of the digital file when executed by the computing device. The processor is configured to spatially position the three-dimensional object at a spatial location in the three-dimensional virtual environment based on the digital file parameters of the digital file. The three-dimensional object is spatially positioned in the three-dimensional virtual environment based on the digital file parameters of the digital file. The processor is configured to enable a user to engage the three-dimensional object as spatially positioned in the three-dimensional virtual environment as requested by the user so that the three-dimensional object is executed in the three-dimensional virtual environment. Execution of the digital file by the computing device is transferred to execution of the three-dimensional object in the three-dimensional virtual environment.

In an embodiment, a method may be implemented for transforming a digital file into a three-dimensional object that is spatially positioned in a three-dimensional virtual environment to visually organize the digital file relative to the three-dimensional virtual environment. The digital file may be received that includes a plurality of digital file parameters and is in a file format that is encoded for storage in a digital storage medium that the digital file is previously stored. The digital file parameters are indicative as to a visual representation of the digital file when executed by a computing device. The digital file may be transformed into the three-dimensional object based on the digital file parameters associated with the digital file. The three-dimensional object is representative of the presentation of the digital file when executed by the computing device. The three-dimensional object may be spatially positioned at a spatial location in the three-dimensional virtual environment based on the digital file parameters of the digital file. A user may be enabled to engage the three-dimensional object as spatially positioned in the three-dimensional virtual environment as requested by the user so that the three-dimensional object is executed in the three-dimensional virtual environment, wherein execution of the digital file by the computing device is transferred to execution of the three-dimensional object in the three-dimensional virtual environment.

Further embodiments, features, and advantages, as well as the structure and operation of the various embodiments, are described in detail below with reference to the accompanying drawings.

BRIEF DESCRIPTION OF THE DRAWINGS

Embodiments are described with reference to the accompanying drawings. In the drawings, like reference numbers may indicate identical or functionally similar elements.

DETAILED DESCRIPTION

Figure 1:
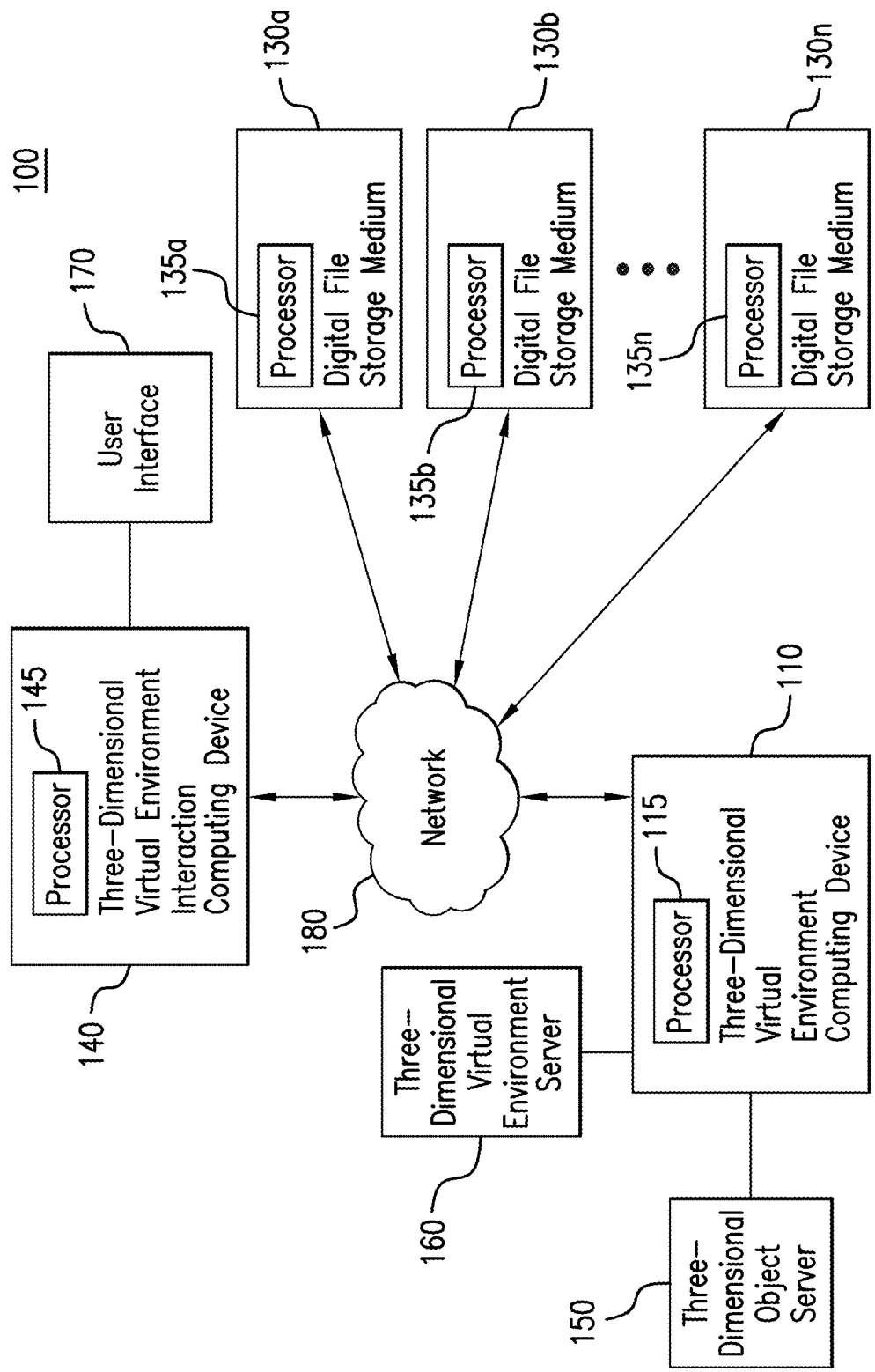
FIG. 1 shows an illustration of a three-dimensional conversion digital file system that may transform a digital file into a three-dimensional object that may then be spatially positioned in a three-dimensional virtual environment so that the digital file may be visually organized in the three-dimensional virtual environment as the three-dimensional object.

Embodiments of the disclosure generally relate to enabling a user to organize and/or access digital files by transforming digital files that are organized in a conventional hierarchy of file folders that provide limited visual context to the user to three-dimensional objects that are positioned in a three-dimensional virtual environment such that the user may associate a visual context to the transformed digital files when navigating and/or executing the three-dimensional objects in the three-dimensional virtual environment. In an example embodiment, the digital files are initially generated in a file format that is encoded in a digital storage medium such as cloud-based file storage and/or server file storage. However, the digital files include digital file parameters that are indicative as to the presentation of the corresponding digital files once executed by a computing device. For example, an image file includes digital file parameters that present the presentation of the image file as the captured image from a camera. A PDF file includes digital file parameters that present the presentation of the PDF file as the text included in the PDF file.

The digital files may then be transformed into three-dimensional objects based on the digital file parameter associated with the digital file such that the corresponding three-dimensional objects are representative of the presentation of the digital files when executed by the computing device. In such an example, the image file may be transformed into a three-dimensional object of a picture frame that frames the image initially captured by the camera by the initially generated image file. The PDF file may be transformed into a three-dimensional object of a book that when opened provides the text of the PDF to the user as included by the initially generated PDF file.

The three-dimensional objects may then be spatially positioned at spatial locations in a three-dimensional virtual environment based on the digital file parameters. In such an example, the image file that is transformed into the three-dimensional object of a picture frame is spatially positioned on a wall included in the three-dimensional virtual environment relative to other picture frames also spatially positioned on other walls included in the three-dimensional virtual environment. The PDF file that is transformed into the three-dimensional object of a book is spatially positioned on a bookshelf included in the three-dimensional virtual environment relative to other books positioned on the bookshelf. The spatial positioning of the three-dimensional objects as well as the transformation of the digital files into the appropriate three-dimensional objects may provide the visual context to the user to navigate amongst the three-dimensional objects with increased efficiency as compared to the digital files when organized in a conventional hierarchy of file folders.

In the Detailed Description herein, references to "one embodiment", an "embodiment", and "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in art to affect such feature, structure, or characteristic in connection with other embodiments whether or not explicitly described.

The following Detailed Description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the Detailed Description is not meant to limit the embodiments described below.

System Overview

As shown in FIG. 1, a three-dimensional conversion digital file system 100 may transform a digital file into a three-dimensional object that may then be spatially positioned in a three-dimensional virtual environment so that the digital file may be visually organized in the three-dimensional virtual environment as the three-dimensional object. Three-dimensional conversion digital file system 100 includes a three-dimensional virtual environment computing device 110 that transforms digital files as stored in a plurality of digital file storage mediums 130(*a-n*), where n is an integer equal to or greater than one, into the three-dimensional object based on the three-dimensional objects stored in a three dimensional object server 150. Three-dimensional virtual environment computing device 110 may also generate the three-dimensional virtual environment based on the three-dimensional virtual environments stored in three-dimensional virtual environment server 160. The user may engage the three-dimensional objects as spatially positioned in the three-dimensional virtual environment via user interface 170 of three-dimensional virtual environment interaction computing device 140. Three-dimensional virtual environment computing device 110 includes processor 115. Digital file storage mediums 130(*a-n*) include corresponding processors 135(*a-n*), where n is an integer that equals the amount of digital file storage mediums 130(*a-n*). Three-dimensional virtual environment interaction computing device 140 includes processor 145.

Individuals engage and/or generate information and/or data numerous times each day. The majority of such information and/or data is generated and/or stored as digital files. A digital file includes data that is discretely stored on digital file storage mediums 130(*a-n*) and may be executed by a computing device to engage the data of the digital file. For example, the digital file includes an image captured by a smart phone and is stored on a digital file storage medium 130(*a-n*) that is the local file storage of the smart phone. The smart phone may then execute the digital file in order to open the digital file and display the image via the display of the smart phone to the user. Digital files may include data such as but not limited to document files such as PDF documents, word documents and so on, web links, audio files, video files, image files, and/or any other type of data that may be included in a digital file and stored on a digital file storage medium 130(*a-n*) and executed by a computing device that will be apparent to those skilled in the relevant art(s) without departing from the spirit and scope of the disclosure.

Figure 2:
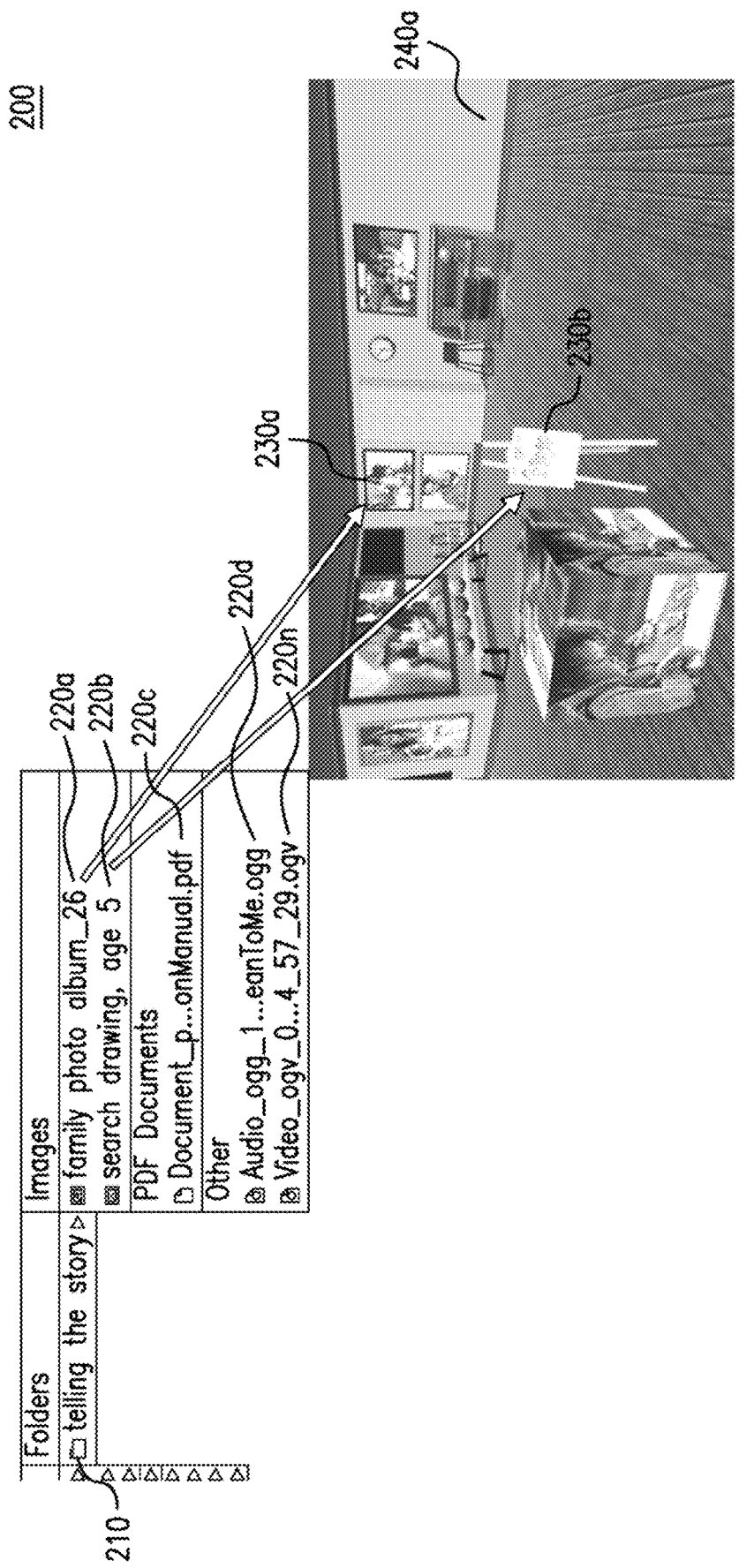
FIG. 2 shows an illustration of an example three-dimensional virtual environment configuration that includes a file folder that includes a plurality of digital files.

Conventionally, digital files are stored in a two-dimension structure of a hierarchy of file folders such that file folders are branched out in a hierarchy structure where each file folder is included in a higher level file folder that includes numerous file folders with a single file folder that is positioned on the top level of the hierarchy of file folders. Then each file folder includes digital files stored in the corresponding file folder. For example as depicted in FIG. 2, a three-dimensional virtual environment configuration 200 includes a file folder 210 that is labeled the "telling the story" file folder 210 includes a plurality of digital files that includes a "family photo album" digital file 220*a* that includes images of a family, a "sarah drawing, age 5" digital file 220*b* that includes an image of a drawing, and so on. The digital files are then stored in digital file mediums 130(*a-n*) via the hierarchy of file folders.

Conventionally, each time a digital file is created and/or saved such digital file is automatically stored by digital file storage medium 130(*a-n*) in a specified file folder included in a hierarchy of file folders included in the corresponding digital file storage medium 130(*a-n*). Typically, a user is limited to intervening as to selecting the file folder included in the corresponding digital file storage medium 130(*a-n*). Even then, digital file storage mediums 130(*a-n*), such as cloud based storage devices, have extensive hierarchy structures of file folders and the user intelligently selecting the appropriate file folder so that the user may easily return to the selected file folder in search of the digital file to execute is not a trivial endeavor.

Further, conventionally digital files are automatically stored by digital file storage mediums 130(*a-n*) without the user even knowing that the storage is occurring let alone knowing the file folder in the hierarchy of file folders that the digital files are being stored. For example, operating systems such as IoS, may automatically store digital files created by the numerous personal computing devices of the user, such as the user's smart phone and/or computing tablet, in the corresponding cloud based storage device for the operating system of the user's personal computing devices, such as iCloud. In doing so, the user may have no knowledge as to the digital file location in the hierarchy of file folders of the numerous digital files, such as image files captured by the user, may be stored in the corresponding cloud based storage device.

Further, conventionally numerous digital files are generated by numerous users included in an organization, such as a corporation, daily. Such numerous digital files are being stored by each of the numerous users in the corresponding file folder as selected by the numerous users in a file storage system for the corporation. The file storage system includes numerous file folders included in the hierarchies of file folders for the file storage system. Different users included in the organization may need to access digital files not only generated by themselves but generated by other users and stored in corresponding digital files as selected by those users. The navigation of the numerous digital files organized in a hierarchy of digital files by users that did not initially select the location where such digital files were saved is not a trivial endeavor and the users commit significant time in locating such digital files resulting in significant inefficiency for the organization.

The majority of data files that users engage on a daily basis are stored in numerous different digital file storage mediums 130(*a-n*). A digital file storage medium 130(*a-n*) is a medium to store digital files such that the digital files may be accessed from the medium and executed in order to engage the data included in the digital file. For example, a digital file storage medium 130(*a-n*) may be associated with a computing device as the computing device accesses digital file storage medium 130(*a-n*) of the computing device to access the digital files stored on digital file storage medium 130(*a-n*) to engage the data included in the digital files. For example, digital file storage mediums 130(*a-n*) may be associated with but not limited to a mobile telephone, a smartphone, a workstation, a portable computing device, other computing devices such as a laptop, or a desktop computer, cluster of computers, set-top box, a cloud server, web browsers such as Google Chrome and Internet Explorer, web applications such as Pinterest, Instagram, Evernote, and Google Photos, cloud based storage devices such as Dropbox and Google Drive, and/or any other suitable electronic device that includes digital file storage mediums 130(*a-n*) that will be apparent to those skilled in the relevant art(s) without departing from the spirit and scope of the disclosure.

Conventionally, such numerous different digital file storage mediums 130(*a-n*) that the user may store numerous different digital files are disconnected and/or unrelated such that the user is required to engage each individual digital file storage medium 130(*a-n*) in order to navigate the numerous digital files stored on each corresponding individual digital file storage medium 130(*a-n*). For example, the user limited to navigating the hierarchies of file folders on the smart phone of the user while capturing and/or generating digital files when using the smart phone while the user is limited to navigating Pinterest for digital files that the user has saved via Pinterest. The digital files stored on the hierarchies of file folders on the smart phone are disconnected from the digital files that the user has saved via Pinterest. The user is required to not only recall the digital files that are stored via the smart phone and the digital files that are stored via Pinterest but also the location of the digital files in the hierarchies of file folders of the smart phone and Pinterest.

In such conventional approaches, digital files that the user requests to access and/or execute is disconnected and/or spread about amongst numerous different digital storage mediums 130(*a-n*) that even the most organized user may become confused as to where each digital file is stored when the user requests to access and/or execute each of the numerous digital files. With numerous different digital file storage mediums 130(*a-n*) that the user stores digital files, the user may have difficulty in remembering which computing device did the user operate when generating the digital file. For example, did the user incorporate the computing device associated with work to generate a personal digital file when at work and incorporating the computing device for work or did the user generate the digital file with the personal computing tablet of the user? Did the personal computing tablet of the user automatically save the digital file generated by the personal computing table of the user in the cloud based storage device of Google Docs or did the user save the digital file in the cloud based storage device of Dropbox.

The user is required when navigating the numerous different digital storage mediums 130(a-n) for a specific digital file to recall the application such as Word, Excel, Pinterest, Instagram and so on to generate the digital file and/or where the user received the digital file if the user did not personally create the digital file. The user is required to determine what the user was doing at the time of the generation of the digital file such as whether the user was navigating Instagram and/or navigating Google Chrome with their computing device for work. The user is required to determine the computing device that the user was incorporating at the time of the generation of the digital file such as whether the user was using their personal computing tablet and/or computing device for work.

The two-dimension structure of the hierarchy of file folders as depicted in FIG. 2 of file folder 210 and digital files 220a and 220b coupled with the disconnection of the numerous digital storage mediums 130(a-n) that the user engages to store the numerous digital files stored with the user is not a trivial structure for the user to navigate. Such a two-dimension structure of the hierarchy of file folders and the disconnection of the numerous digital storage mediums 130(a-n) lack a memorization process that enables the user to easily recall the location that a specific digital file is stored. Typically, individuals execute efficient recollection of memories by incorporating sensory cues and in particular visual cues. However, the two-dimension structure of the hierarchy of folders as shown in FIG. 2 with the digital file 210 and digital files 220a and 220b as well as the disconnection of the numerous digital storage mediums 130(a-n) prevent the user from having visual cues as to the specific file folder in the vast hierarchy of file folders that the digital file is stored let alone digital storage medium 130(a-n) that the digital file is stored as well as further assisting with other sensory cues.

Further, regarding the conventional file storage system of an organization, such as a corporation, numerous digital files generated by numerous users are stored in numerous different locations in the hierarchy of file folders of the file storage system. The location of such numerous digital files that in particular were generated and/or stored by other users also triggers immense difficulty and/or confusion amongst the numerous users resulting in significant inefficiencies for the organization. Without any visual cues as to where each of the numerous digital files are stored in the numerous hierarchy of file folders included in the file storage system, significantly hinders the numerous users from efficiently locating the specific digital file amongst numerous digital files that the user may not have even generated and/or stored at the moment that the user requires to access and/or execute the digital file.

Three-dimensional conversion digital file system 100 may address the challenges of the conventional digital file storage of the two-dimension hierarchy of file folders as well as the disconnection of the numerous different digital file storage mediums 130(a-n) that the user incorporates with the digital file storage of their digital files. Three-dimensional conversion digital file system 100 transforms a digital file into a three-dimensional object that is spatially positioned in a three-dimensional virtual environment to visually organize the digital file relative to the three-dimensional virtual environment. In doing so, three-dimensional conversion digital file system 100 may provide sensory cues to the user regarding the storage of different digital files. Three-dimensional conversion digital file system 100 may transform the digital files into three-dimensional objects that provide visual context to the user as to the content of the digital files.

Three-dimensional conversion digital file system 100 may also spatially position the three-dimensional objects in the three-dimensional virtual environment such that the spatial positioning of the three-dimensional objects in the three-dimensional virtual environment also provides visual context to the user as to the location of the digital files. Rather than providing a two-dimension hierarchy of file folders for the user to navigate the location of digital files, three-dimensional conversion digital file system 100 provides a three-dimensional spatial relationship of the digital files converted to three-dimensional virtual objects to the three-dimensional virtual environment to further enhance the visual cues provided to the user as to the location of the digital files.

Further, three-dimensional conversion digital file system 100 may integrate the numerous different digital file storage mediums 130(a-n) that the user incorporates with the digital file storage of their digital files. The numerous digital files stored on the numerous digital file storage mediums 130(a-n) may be transformed into three-dimensional objects and then integrated into a single three-dimensional virtual environment. In doing so, the user may navigate throughout the single three-dimensional virtual environment and engage the numerous different digital files that have been transformed into three-dimensional objects pulled from the numerous different digital file storage mediums 130(a-n) rather than having to navigate through each of the numerous digital file storage mediums 130(a-n) in a disconnected manner. Thus, three-dimensional conversion digital file system 100 may provide a significantly enhanced and efficient experience to the user in navigating the three-dimensional virtual environment to locate specific digital files that the user is requesting to execute via the three-dimensional visual context provided by three-dimensional conversion digital file system 100 to the user.

Three-dimensional conversion digital file system 100 may convert a digital file to a three-dimensional object that may change dynamically according to the digital file type, the position of the three-dimensional object in the three-dimensional virtual environment, the metadata included in the digital file, and/or customization of the three-dimensional object and/or the positioning of the three-dimensional object in the three-dimensional virtual environment by the user. Three-dimensional conversion digital file system 100 includes three-dimensional virtual environment computing device 110. Three-dimensional virtual environment computing device 110 receives the digital file that includes a plurality of digital file parameters and is in a file format that is encoded for storage in a digital file storage medium 130(a-n) that the digital file is previously stored. The digital file parameters are indicative as to a presentation of the digital file when executed by a computing device.

As noted above, a digital file is in a file format that is encoded to be discretely stored on digital file storage mediums 130(a-n). The digital file when executed by a computing device results in a presentation of the digital file that may be engaged by the user. For example, as shown in FIG. 2, a "sarah drawing, age 5" digital file 220b when executed by a computing device results in a visual presentation of a drawing that may be viewed by the user. The digital file includes digital file parameters that are indicative as to the presentation of the digital file when executed by a computing device. For example, the "sarah drawing, age 5" digital file 220b includes digital file parameters that represent the visual presentation of the actual drawing completed by Sarah at age 5 as captured by a camera to generate the "sarah drawing, age 5" digital file 220b that represents the image of the actual drawing completed by Sarah at age 5 as captured by the camera. The digital file parameters included in the "sarah drawing, age 5" digital file 220b enable the "sarah drawing, age 5" digital file 220b to depict the image of the actual drawing completed by Sarah at age 5 when executed by a computing device.

Digital file parameters may include but are not limited to text parameters that when executed depict the text, image parameters that when executed depict the image, web link parameters that when executed depict the web page, audio parameters that when executed provide the audio, video parameters that when executed depict the video and the associated audio, and/or any other type of digital file parameters that are indicative as to a presentation of the digital file when executed by a computing device that will be apparent to those skilled in the relevant art(s) without departing from the spirit and scope of the disclosure.

As noted above, three-dimensional virtual environment computing device 110 may receive numerous digital files that are previously stored on numerous different digital file storage mediums 130(a-n). Rather than requiring the user to navigate the location of digital files on each individual digital file storage medium 130(a-n) in a disconnected manner, three-dimensional virtual environment computing device 110 may integrate the numerous different digital file storage mediums 130(a-n) such that three-dimensional virtual environment computing device 110 may receive numerous digital files from any of the numerous digital file storage mediums 130(a-n) that the user has digital files stored. In doing so, three-dimensional virtual environment computing device 110 may centralize the navigation of the numerous digital files previously stored in numerous different digital file storage mediums 130(a-n) for the user in a single platform which is the three-dimensional virtual environment.

For example, three-dimensional virtual environment computing device 110 may browse the hierarchy of file folders of the different hard drives associated with the different computing devices that the user has previously stored digital files to receive the appropriate digital files to transform and provide in the three-dimensional virtual environment. In such an example, three-dimensional virtual environment computing device 110 may operate as an application on three-dimensional virtual environment interaction computing device 140. Three-dimensional virtual environment interaction computing device 140 may be the computing device in which the user requests to engage the three-dimensional virtual environment and thus three-dimensional virtual computing device 110 may operate as an application on three-dimensional virtual environment computing device 110. In such an example as shown in FIG. 2, the user may browse the contents of the hard drive of three-dimensional virtual environment computing device 110 and identify the image included in "sarah drawing, age 5" digital file 220b as stored on the hard drive of three-dimensional virtual environment interaction computing device 140 such that three-dimensional virtual environment computing device 110 thereby receives "sarah drawing, age 5" digital file 220b via the application on three-dimensional virtual environment interaction computing device 140.

In another example, three-dimensional virtual environment computing device 110 may browse the hierarchy of file folders of different cloud based storage devices, such as but not limited to drop box, Google Drive and so on. In such an example, three-dimensional virtual environment computing device 110 may operate as an application on three-dimensional virtual environment interaction computing device 140 and the user may then access the different cloud based storage devices via three-dimensional virtual environment interaction computing device 140. In such an example as shown in FIG. 2, the user may browse the contents of the different cloud based storage devices and identify the PDF document included in PDF document digital file 220c as stored on the cloud based storage device such that three-dimensional virtual environment computing device 110 thereby receives PDF document digital file 220c.

In another example, three-dimensional virtual environment computing device 110 may include a built-in web browser such that the user may browse the Internet via the built-in web browser included in three-dimensional virtual environment computing device 110 to identify digital files stored on web pages of the Internet. In such an example as shown in FIG. 2, the user may browse the Internet for a specific web page via the built-in web browser included in three-dimensional virtual environment computing device 110 and identify the audio file included in audio file 220d as stored on the web page such that three-dimensional virtual environment computing device 110 thereby receives audio file 220d. In another example, the user may capture a snapshot of a web page to identify the web page such that three-dimensional virtual environment computing device 110 thereby receives the web page via the built-in web browser included in three-dimensional virtual environment computing device 110.

In another example, the user may browse a specific web browser via three-dimensional virtual environment interaction computing device 140 such as Google Chrome when not engaging three-dimensional virtual environment computing device 110. In such an example, the user may identify a web page via the specific web browser that the user would like three-dimensional virtual environment computing device 110 to receive. Three-dimensional virtual environment computing device 110 may provide a plug-in to the specific web browser as the user is browsing the specific web browser via three-dimensional virtual environment interaction computing device 140. In doing so, the user may capture the identified web page via the plug-in to the specific web browser by three-dimensional virtual environment computing device 110 such that three-dimensional virtual environment computing device 110 thereby receives the identified web page via the plug-in to the specific web browser.

In another example, three-dimensional virtual environment computing device 110 may browse the digital files stored on the smart phone of the user to receive the appropriate digital files to transform and provide in the three-dimensional virtual environment. In such an example, three-dimensional virtual environment computing device 110 operates as application on the smart phone of the user which is three-dimensional virtual environment computing device 140 in this example. In doing so, the user may capture digital files via the smart phone of the user which is three-dimensional virtual environment computing device 140 in this example such that three-dimensional virtual environment computing device 110 receives digital files captured by the smart phone of the user via the application on the smart phone of the user. In such an example as shown in FIG. 2, the user may capture the video included in video file 220n via the smart phone of the user and then stored on the smart phone of the user such that three-dimensional virtual environment computing device 110 thereby receives video file

220*n* via the application on the smart phone which is three-dimensional virtual environment computing device 140 in this example.

In another example, three-dimensional computing device 110 may browse the immense digital files stored in immense file folders included in immense hierarchies of file folders of digital file storage system for an organization, such as a corporation. In such an example, three-dimensional computing device 110 may automatically transfer the immense digital files stored in the immense file folders without user intervention and thereby receive the immense digital files without user intervention. Three-dimensional computing device 110 may receive the digital files by automatically browsing hard drives, the user identifying digital files stored on the hard drives, automatically browsing cloud based storage devices, the user identifying digital files stored on cloud based storage devices, automatically browsing web pages, the user identifying digital files stored on web pages, automatically browsing smart phones, the user identifying digital files stored on smart phones, receive digital files via email, receive digital files via bookmark services and/or any other approach to receive digital files that will be apparent to those skilled in the relevant art(s) without departing from the spirit and scope of the disclosure.

After three-dimensional virtual environment computing device 110 receives the numerous digital files from the numerous digital file storage mediums 130(*a-n*), three-dimensional virtual environment computing device 110 may transform the digital file into the three-dimensional object based on the digital file parameters associated with the digital file. The three-dimensional object is representative of the presentation of the digital file when executed by the computing device. As noted above, the digital file that when executed by the computing device results in a presentation of the digital file by the computing device. For example as shown in FIG. 2, the PDF document digital file 220*c* when executed by the computing device results in a visual presentation of the PDF including any text and images included in the PDF as displayed by the computing device for the user to engage. Rather than simply present the digital file in a two-dimension hierarchy of file folders for the user to navigate to identify the digital file, three-dimensional virtual environment computing device 110 may transform the digital file into a three-dimensional object that represents the digital file.

Three-dimensional virtual environment computing device 110 may transform the digital file into a three-dimensional object that represents the digital file based on the digital file parameters associated with the digital file. As noted above, the digital file includes digital file parameters that are indicative as to the presentation of the digital file when executed by the computing device. For example, the PDF document digital file 220*c* includes digital file parameters that represent the visual presentation of the generated PDF that includes the text and images included in the document that was transformed into the PDF. The digital file parameters included in PDF document digital file 220*c* enable PDF document digital file 220*c* to depict the text and images included in the document that was transformed into the PDF when executed by the computing device.

Three-dimensional virtual environment computing device 110 may then transform the digital file into a three-dimensional object that represents the digital file based on the digital file parameters associated with the digital file. Three-dimensional virtual environment computing device 110 may transform the digital file into a three-dimensional object that provides sensory cues to the user as to the digital file parameters associated with the digital file that is transformed into the three-dimensional object. The sensory cues associated with the three-dimensional object enable the user to associate the sensory cues with the digital file parameters included in the digital file. In doing so, the user may identify the three-dimensional object based on the sensory cues associated with the three-dimensional object that are based on the digital file parameters included in the digital file rather than navigating through the two-dimension hierarchy of file folders to identify the digital file.

For example as shown in FIG. 2, three-dimensional virtual environment computing device 110 may transform "family photo album" digital file 220*a* that is initially provided in a two-dimension hierarchy of file folders for the user to navigate to identify "family photo album" digital file 220*a* into a three-dimensional object that is a framed picture 230*a* that displays one of the images included in "family photo album" digital file 220*a*. Three-dimensional virtual environment computing device 110 may generate the three-dimensional object of the framed picture 230*a* that displays one of the images included in "family photo album" digital file 220*a* based on the digital file parameters of "family photo album" digital file 220*a*. "Family photo album" digital file 220*a* includes the digital file parameters of images captured of the family. Three-dimensional virtual environment computing device 110 may then transform "family photo album" digital file 220*a* into the framed picture 230*a* that displays one of the images included in "family photo album" digital file 220*a* based on the digital file parameters of images captured of the family. In doing so, the user may easily identify the three-dimensional object of the framed picture 230*a* that displays one of the images included "family photo album" digital file 220*a* as "family photo album" digital file 220*a* as opposed to having to navigate through a two-dimension hierarchy of file folders to identify "family photo album" digital file 220*a*.

In an embodiment, three-dimensional virtual environment computing device 110 may transform digital files into three-dimensional objects that may change dynamically based on the file type of the digital file, placement of the three-dimensional object in the three-dimensional virtual environment, metadata associated with the digital file, and/or user customization in that the user may influence the three-dimensional object that the digital file is transformed. The digital file may be considered a knowledge item. As noted above, the digital file may include but is not limited to a word processing document, an image file, an audio file, a PDF document, a video file, a web link, a document stored on a cloud based storage device, that will be apparent to those skilled in the relevant art(s) without departing from the spirit and scope of the disclosure. In such an embodiment, each of the numerous digital files may be considered a knowledge item.

In such an embodiment, each knowledge item may then include digital file parameters that may be translated into distinct visual characteristics of a three-dimensional object that may trigger sensory cues for the user so that the user may more easily recognize and/or interact with the digital file that has been transformed into the three-dimensional object. For example, a digital file that is an image may be transformed into a three-dimensional object that is a framed picture and/or a Polaroid that depicts the image included in the digital file. In another example, a digital file that is a PDF document may be transformed into a book that is positioned on a bookshelf that depicts the digital file parameters that the PDF is a readable document by the user that includes text and/or images.

In such an embodiment, the three-dimensional object that is then generated from the digital file that is the knowledge item based on the digital file parameters may be considered a knowledge object. Three-dimensional virtual environment computing device 110 may generate the knowledge object based on the digital file parameters. For example, three-dimensional virtual environment computing device 110 may generate the knowledge object of an electronic book associated with soccer that is a book due to the knowledge item being an electronic book. However, the user may also customize the knowledge item to become a knowledge object that the user may better recognize. In such an example, the user may customize the knowledge item of the electronic book associated with soccer and request that three-dimensional virtual environment computing device 110 transform the electronic book associated with soccer into a soccer ball rather than a book as the user may better recognize the knowledge object of the soccer ball as being the knowledge item of the electronic book associated with soccer as compared to the knowledge object of the book.

Three-dimensional virtual environment computing device 110 may also generate the knowledge object based on a surface in the three-dimensional virtual environment that the knowledge item is positioned. For example, three-dimensional virtual environment computing device 110 may transform the knowledge item depending on but not limited to whether the knowledge item is positioned on a horizontal ceiling, a vertical wall, a floor, a tabletop and/or any other surface that the knowledge item may be positioned in the three-dimensional virtual environment that will be apparent to those skilled in the relevant art(s) without departing from the spirit and scope of the disclosure. Three-dimensional virtual environment computing device 110 may also generate the knowledge object based on a three-dimensional furniture object that the knowledge item is positioned. For example, three-dimensional virtual environment computing device 110 may transform the knowledge item depending on whether the knowledge item is positioned in but not limited to a drawer, cabinet, bookshelf, and/or any other three-dimensional furniture object that the knowledge item may be positioned on in the three-dimensional virtual environment that will be apparent to those skilled in the relevant art(s) without departing from the spirit and scope of the disclosure.

Three-dimensional virtual environment computing device 110 may retrieve the three-dimensional object that the corresponding digital file is to be transformed to from three-dimensional object server 150. Three-dimensional virtual environment computing device 110 may determine the three-dimensional object that the digital file is to be transformed may retrieve the three-dimensional object that the digital file is to be transformed from three-dimensional object server 150. Three-dimensional virtual environment computing device 110 may analyze the digital file parameters associated with the digital file and then based on the digital file parameters retrieve the three-dimensional object that the corresponding digital file is to be transformed from three-dimensional object server 150. Three-dimensional virtual environment computing device 110 may retrieve the three-dimensional object that the corresponding digital file is to be transformed from a mobile telephone, a smartphone, a workstation, a portable computing device, other computing devices such as a laptop, or a desktop computer, cluster of computers, set-top box, a cloud server, web browsers such as Google Chrome and Internet Explorer, web applications such as Pinterest, Instagram, Evernote, and Google Photos, cloud based storage devices such as Dropbox and Google Drive, and/or any other suitable electronic device that includes digital file storage mediums 130(*a-n*) that will be apparent to those skilled in the relevant art(s) without departing from the spirit and scope of the disclosure.

Three-dimensional virtual environment computing device 110 may spatially position the three-dimensional object at a spatial location in the three-dimensional virtual environment based on the digital file parameters of the digital file. The three-dimensional virtual environment is an environment that provides context to the user in which the three-dimensional virtual objects are positioned within the three-dimensional virtual environment in a manner that enables the user to navigate through the three-dimensional virtual environment and identify the three-dimensional virtual objects based on the positioning of the three-dimensional virtual objects in the three-dimensional virtual environment. In doing so, the three-dimensional virtual environment provides additional sensory cues to the user as to the position of the three-dimensional objects relative to the location in the three-dimensional virtual environment that the three-dimensional objects are positioned.

The three-dimensional virtual environment may include but is not limited to a virtual reality in that the three-dimensional objects are spatially positioned in a simulated and/or immersive environment. The three-dimensional virtual environment may include but is not limited to an augmented reality in that the three-dimensional objects are spatially positioned in a real-world environment. The three-dimensional virtual environment may include but is not limited to a mixed reality in that the three-dimensional objects are spatially positioned in merger of virtual and augmented environments. The three-dimensional virtual environment may include any type of three-dimensional environment that three-dimensional objects may be spatially positioned based on the digital file parameters of the corresponding digital file that will be apparent to those skilled in the relevant art(s) without departing from the spirit and scope of the disclosure.

For example as shown in FIG. 2, the "sarah drawing, age 5" digital file 220*b* that includes an image of a drawing completed by Sarah at age 5 may be transformed by three-dimensional virtual environment computing device 110 from the digital file of an image of the drawing completed by Sarah at age 5 to the three-dimensional object of such an image displayed on easel 230*b*. Further, three-dimensional virtual environment computing device 110 may generate the three-dimensional virtual environment that the image displayed on the easel 230*b* is to be spatially positioned that includes numerous rooms 240(*a-n*), where n is an integer equal to or greater than one, of a floor plan in a setting of a gallery and/or house. The generation of the three-dimensional virtual environment that includes rooms 240(*a-n*) of a floor plan in a setting of a gallery and/or house provides additional context to the user as to the location of the image displayed on the easel 230*b*. The user may navigate throughout the floor plan setting of the gallery and/or house and identify the room 240*a* in which three-dimensional virtual environment computing device 110 may be spatially positioned as the image displayed on the easel 230*b* such that the user may distinguish between room 240*a* that the image displayed on the easel 230*b* is positioned as opposed to the additional rooms 240(*a-n*) included in the floor plan setting of the gallery and/or house. In doing so, the different rooms 240(*a-n*) may provide additional sensory cues to the user as the location of the image displayed on the easel 230*b* in the three-dimensional virtual environment.

As noted above, the digital file includes digital file parameters that are indicative as to the presentation of the digital file when executed by the computing device. Three-dimensional virtual environment computing device 110 may incorporate the digital file parameters of the digital file when spatially positioning the three-dimensional object at a spatial location in three-dimensional virtual environment. The presentation of the digital file when executed by the computing device as provided by the digital file parameters of the digital file may provide additional context as to the spatial position of the three-dimensional object in the three-dimensional virtual environment after the digital file is transformed into the three-dimensional object. In doing so, the user may correlate the presentation of the digital file when executed by the computing device into a corresponding spatial location of the three-dimensional virtual environment to provide additional sensory cues to the user as to the location of the three-dimensional object in the three-dimensional virtual environment.

For example as shown in FIG. 2, three-dimensional virtual environment computing device 110 may incorporate the digital file parameters of "family photo album" digital file 220*a* in that the digital file parameters include different images of family into spatially positioning the three-dimensional object into the three-dimensional virtual environment. Three-dimensional virtual environment computing device 110 may transform the "family photo album" digital file 220*a* into the framed picture 230*a* that displays image from the "family photo album" digital file 220*a*. Three-dimensional virtual environment computing device 110 may then spatially position the framed picture 230*a* on a wall in room 240*a* of the three-dimensional virtual environment based on the digital file parameters of different images of family associated with the "family photo album" digital file 220*a*. The positioning of the framed picture 230*a* on the wall in room 240*a* based on the digital file parameters of different images of family associated with "family photo album" digital file 220*a* may provide additional context to the user as the user may associate different images of family as being transformed into a framed picture 230*a* and spatially positioned on a wall in room 240*a* of the three-dimensional virtual environment.

The spatial positioning of the three-dimensional object at a spatial location in the three-dimensional virtual environment is the positioning of the three-dimensional object in the three-dimensional virtual environment relative to other positions in the three-dimensional virtual environment and other three-dimensional virtual objects based on the digital file parameters of the digital file. The spatial positioning of the digital object at the spatial location in the three-dimensional virtual environment relative to other positions in the three-dimensional virtual environment and other three-dimensional virtual objects may provide additional context to the user as to the spatial location in the three-dimensional object in the three-dimensional virtual environment. In doing so, the user may correlate the spatial position of the three-dimensional object relative to other positions in the three-dimensional virtual environment and other three-dimensional objects to provide additional sensory cues to the user as to the location of the three-dimensional object in the three-dimensional virtual environment.

For example as shown in FIG. 2, three-dimensional virtual environment computing device 110 may incorporate the digital file parameters of "family photo album" digital file 220*a* to transform the "family photo album" digital file 220*a* into a framed picture 230*a* and then spatially position the famed picture 230*a* on the wall in room 240*a* of the three-dimensional virtual environment. Three-dimensional virtual environment computing device 110 may then incorporate digital file parameters of the "sarah drawing, age 5" digital file 220*b* to transform "sarah drawing, age 5" digital file 220*b* into the image displayed on easel 230*b* and then spatially position the image displayed on easel 230*b* on the floor in room 240*a* of the three-dimensional virtual environment. The spatial positioning of "family photo album" digital file 220*a* and the "sarah drawing, age 5" digital file 220*b* into the same room 240*a* of the three-dimensional virtual environment may provide the user additional context that family related images are spatially positioned in room 240*a*. The user may navigate throughout the three-dimensional virtual environment and identify that room 240*a* as a spatial location of family related images. Further, the spatial positioning of the framed picture 230*a* on the wall of room 240*a* and the image displayed on easel 230*b* on the floor of room 240*a* relative to each other may provide additional sensory cues to the user as to the location of the family related images in room 240*a* relative to each other.

In another example, three-dimensional virtual environment computing device 110 may incorporate the digital file parameters of numerous digital files stored in a file storage system associated with an organization and automatically transform those numerous digital files into three-dimensional objects based on the digital file parameters of each of the numerous digital files. Three-dimensional virtual environment computing device 110 may then incorporate the digital file parameters of each of the numerous digital files to spatially position the transformed three-dimensional objects relative to each other and relative to the three-dimensional virtual environment. In such an example, three-dimensional virtual environment computing device 110 may generate a three-dimensional virtual environment of a library. Three-dimensional virtual computing device 110 may then transform the numerous digital files stored in the file storage system associated with the organization into books. Three-dimensional virtual environment computing device 110 may then spatially positon the numerous books in the library setting of the three-dimensional virtual environment based on the titles of each of the corresponding digital files. In doing so, the user may navigate the library setting of the three-dimensional virtual environment for books that are spatially positioned relative to each other based on the titles of the corresponding digital files to identify the location of the digital files stored in the library relative to each other as books.

In an embodiment, the three-dimensional virtual environment may be considered a spatially accessible gallery of archived knowledge. In doing so, the three-dimensional virtual environment may be a virtual space in which the user may place their knowledge items such that the user may navigate throughout the three-dimensional virtual environment. The assistance of the sensory cues provided by the three-dimensional objects that represent the knowledge items and the three-dimensional virtual environment may provide the user with the assistance to more easily locate the digital files that have been transformed into three-dimensional objects and positioned in the three-dimensional virtual environment. The knowledge may then also be spatialized when positioned in the three-dimensional virtual environment.

Once the knowledge object is spatialized in the three-dimensional virtual environment as the three-dimensional object, the form of the knowledge object may be changed, moved, and/or modified as appropriate by three-dimensional virtual environment computing device 110 and/or as customized by the user. In doing so, the user may engage their digital files as transformed into three-dimensional objects and spatialized in the three-dimensional virtual environment as spatialized knowledge. The user may do so through a three-dimensional interface embedded in the three-dimensional objects that enable reading, viewing, listening, annotating and so on of the digital files as transformed into the three-dimensional objects as spatialized in the three-dimensional virtual environment.

Three-dimensional virtual environment computing device 110 may retrieve the three-dimensional virtual environments that the three-dimensional objects are to be spatially positioned from three-dimensional object server 150. Three-dimensional virtual environment computing device 110 may determine the three-dimensional virtual environment that the digital files are to be transformed into three-dimensional objects and then spatially positioned and may retrieve such three-dimensional virtual environment from three-dimensional virtual environment server 160. Three-dimensional virtual environment computing device 110 may analyze the digital file parameters associated with the numerous digital files and then based on the digital file parameters retrieve the three-dimensional virtual environment that the digital files are to be transformed into three-dimensional objects and then spatially positioned.

In an embodiment, a plurality of three-dimensional virtual environments may be generated such that several spatial accessible galleries of archived knowledge may be generated. Each different three-dimensional virtual environment may provide a different experience to the user such that each three-dimensional virtual environment may provide different sensory cues associated with different digital files that have been transformed into different three-dimensional virtual objects and positioned in different three-dimensional virtual environments. For example, a first three-dimensional virtual environment may include a house and a second three-dimensional virtual environment may include rooms of a gallery, a third three-dimensional virtual environment may include a library and so on.

Three-dimensional virtual environment computing device 110 may provide portal access such that the user may simply navigate to each portal associated with each corresponding three-dimensional virtual environment. In doing so, three-dimensional virtual environment computing device 110 may automatically transport the position of the user to the corresponding three-dimensional virtual environment that the user requests to access the portal associated with the corresponding three-dimensional virtual environment. For example, three-dimensional virtual environment computing device 110 may automatically transfer the user to the three-dimensional virtual environment of the house when the user navigates to the portal associated with the house. Three-dimensional virtual computing device 110 may then automatically transfer the user to the three-dimensional virtual environment of the gallery when the user navigates to the portal associated with the gallery.

In an embodiment, the user may build the three-dimensional virtual environment that the user requests to spatially position digital files transformed into three-dimensional objects. In such an embodiment, three-dimensional virtual environment computing device 110 may retrieve the three-dimensional virtual environment from three-dimensional virtual environment server 160 based on the requests of the user to build the three-dimensional virtual environment. Three-dimensional environment may include but is not limited to rooms of a house, rooms of a gallery, a library, rooms with walls and a ceiling that may be modeled after an actual structure such as the Morgan Library and/or the Sistine Chapel, a park, a forest, a cave, a spaceship, a submarine, an abstract environment, and/or any other type of three-dimensional virtual environment that digital files may be transformed into three-dimensional objects and spatially positioned in the three-dimensional virtual environment to provide the user sensory cues that will be apparent to those skilled in the relevant art(s) without departing from the spirit and scope of the disclosure.

In an embodiment, three-dimensional virtual environment may include viewpoints such that several different viewpoints may be positioned throughout the three-dimensional virtual environment. The three-dimensional virtual environment may be vast and include numerous different rooms and/or areas as well as numerous different three-dimensional objects. Navigation throughout the three-dimensional virtual environment by the user to engage the particular three-dimensional objects spatially positioned in the three-dimensional virtual environment may not be trivial. For example, the user navigating to the particular room that includes the particular three-dimensional objects that the user is interested in engaging at the time may take a significant amount of time for the user to navigate to that particular room.

Rather than having to navigate to the particular area of the three-dimensional virtual environment by the user, the user may obtain a position at several different viewpoints positioned throughout the three-dimensional virtual environment. Three-dimensional virtual environment computing device 110 may then automatically display a view to the user of the corresponding area of the three-dimensional virtual environment of the corresponding viewpoint that the user is positioned. For example, the user may position at a viewpoint that corresponds to a particular wall included in the three-dimensional virtual environment. Three-dimensional virtual environment computing device 110 may then automatically display to the user the wall that corresponds to the viewpoint that the user is positioned. The user may then position at a viewpoint that corresponds to a ceiling included in the three-dimensional virtual environment. The three-dimensional virtual environment computing device 110 may then automatically display to the user the ceiling that corresponds to the viewpoint that the user is positioned.

Three-dimensional virtual environment computing device 110 may enable the user to engage the three-dimensional object as spatially positioned in the three-dimensional virtual environment as requested by the user so that the three-dimensional object is executed in the three-dimensional virtual environment. Execution of the digital file by the computing device is transferred to execution of the three-dimensional object in the three-dimensional virtual environment. After the digital files have been transformed into the three-dimensional objects and have been spatially positioned in the three-dimensional virtual environment, the user may then navigate throughout the three-dimensional virtual environment such that the three-dimensional objects may then be executed as requested by the user such that the execution of the digital files by a computing device is transferred to the execution of the three-dimensional virtual environment.

In doing so, the user may engage the three-dimensional objects such that the three-dimensional objects may be executed when requested by the user in a manner that similar to when the corresponding digital files are executed by a computing device. As a result, three-dimensional virtual environment computing device 110 may enable the three-dimensional objects to be executed in the three-dimensional virtual environment such that the user may engage such execution of the three-dimensional objects in the three-dimensional virtual environment as if the user is engaging the execution of the corresponding digital files by the computing device. Thus, the user may receive a similar experience regarding the execution of the three-dimensional object in the three-dimensional virtual environment as the execution of the digital file by the computing device.

For example as shown in FIG. 2, "family photo album" digital file 220a is a digital file that when executed by the computing device displays the different images included in the digital file. Three-dimensional virtual environment computing device 110 may then transform the "family photo album" digital file 220a into the three-dimensional object of the framed picture 230a that is then spatially positioned in the room 240a of the three-dimensional virtual environment. Three-dimensional virtual environment computing device 110 may then enable the three-dimensional object of the framed picture 230a to be executed as spatially positioned in the room 240a of the three-dimensional virtual environment such that when executed the three-dimensional object of the framed picture 230a displays the different images included in the "family photo album" digital file 220a to the user in a similar manner as if the "family photo album" digital file 220a is executed by the computing device.

Examples of three-dimensional virtual environment computing device 110 may include a mobile telephone, a smartphone, a workstation, a portable computing device, other computing devices such as a laptop, or a desktop computer, cluster of computers, set-top box, virtual reality headset, augmented reality headsets, smart glasses, mixed reality headsets, and/or any other suitable electronic device that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

Three-dimensional virtual environment interaction computing device 140 may be the computing device that the user engages in order to engage the three-dimensional virtual objects spatially positioned in the three-dimensional virtual environment as generated by three-dimensional virtual environment computing device 110. As noted above, three-dimensional virtual environment computing device 110 may transform data files into three-dimensional objects and spatially position the three-dimensional objects in the three-dimensional virtual environment. The user may engage and provide input as to the data files to transform to three-dimensional objects and the spatial positioning of the three-dimensional objects in the three-dimensional virtual environment via three-dimensional virtual environment interaction computing device 140.

Also as noted above, three-dimensional virtual environment computing device 110 may enable the three-dimensional objects to be executed such that the execution of the digital files by the computing device is transferred to the execution of the three-dimensional objects in the three-dimensional virtual environment. The user may engage such execution of the three-dimensional objects via three-dimensional virtual environment interaction computing device 140. Three-dimensional virtual environment interaction computing device 140 may include but is not limited to the smart phone of the user, the personal computer of the user, the personal laptop of the user, the personal tablet of the user, the work computer of the user, and/or any other type of computing device that the user may engage the three-dimensional objects as spatially positioned in the three-dimensional virtual environment that will be apparent to those skilled in the relevant art(s) without departing from the spirit and scope of the disclosure.

Examples of three-dimensional virtual environment interaction computing device 140 may include a mobile telephone, a smartphone, a workstation, a portable computing device, other computing devices such as a laptop, or a desktop computer, cluster of computers, set-top box, the personal computer of the user, the work computer of the user and/or any other type of computing device that the user may engage the three-dimensional objects as spatially positioned in the three-dimensional virtual environment that will be apparent to those skilled in the relevant art(s) without departing from the spirit and scope of the disclosure.

In an embodiment, multiple modules may be implemented on the same computing device. Such a computing device may include software, firmware, hardware or a combination thereof. Software may include one or more applications on an operating system. Hardware can include, but is not limited to, a processor, a memory, and/or graphical user interface display.

The user may engage the three-dimensional objects spatially positioned in the three-dimensional virtual environment as displayed via user interface 170. User interface 170 may include any type of display device including but not limited to a touch screen display, a liquid crystal display (LCD) screen, and/or any other type of display device that includes a display that will be apparent from those skilled in the relevant art(s) without departing from the spirit and scope of the present disclosure.

As shown, the digital files may be accessed by three-dimensional virtual environment computing device 110 from digital file storage mediums 130(a-n) and the user may engage the three-dimensional objects spatially positioned in the three-dimensional virtual environment via network 180. Network 180 includes one or more networks, such as the Internet. In some embodiments of the present disclosure, network 180 may include one or more wide area networks (WAN) or local area networks (LAN). Network 180 may utilize one or more network technologies such as Ethernet, Fast Ethernet, Gigabit Ethernet, virtual private network (VPN), remote VPN access, a variant of IEEE 802.11 standard such as Wi-Fi, and the like. Communication over network 180 takes place using one or more network communication protocols including reliable streaming protocols such as transmission control protocol (TCP). Each of the numerous user communications devices 140 may interface with multi-tenant computing device 110 via network 180 through an application programming interface (API), web interface and/or any other type of interface that will be apparent from those skilled in the relevant art(s) without departing from the spirit and scope of the present disclosure. These examples are illustrative and not intended to limit the present disclosure.

Generation of Three-Dimensional Virtual Environments

As noted above, three-dimensional virtual environment computing device 110 may transform digital files into three-dimensional objects and then spatially position the three-dimensional objects in the three-dimensional virtual environment such that the user may navigate the three-dimensional virtual environment for the three-dimensional objects and thereby execute the three-dimensional objects as if the three-dimensional objects are the digital files. Three-dimensional environment computing device 110 may generate the three-dimensional virtual environment that includes a plurality of dimensions that maps out the visual representation of the three-dimensional virtual environment as displayed to the user. The three-dimensional virtual environment includes a plurality of spatial coordinates with each spatial coordinate identifying a corresponding spatial location in the three-dimensional virtual environment.

Figure 3:
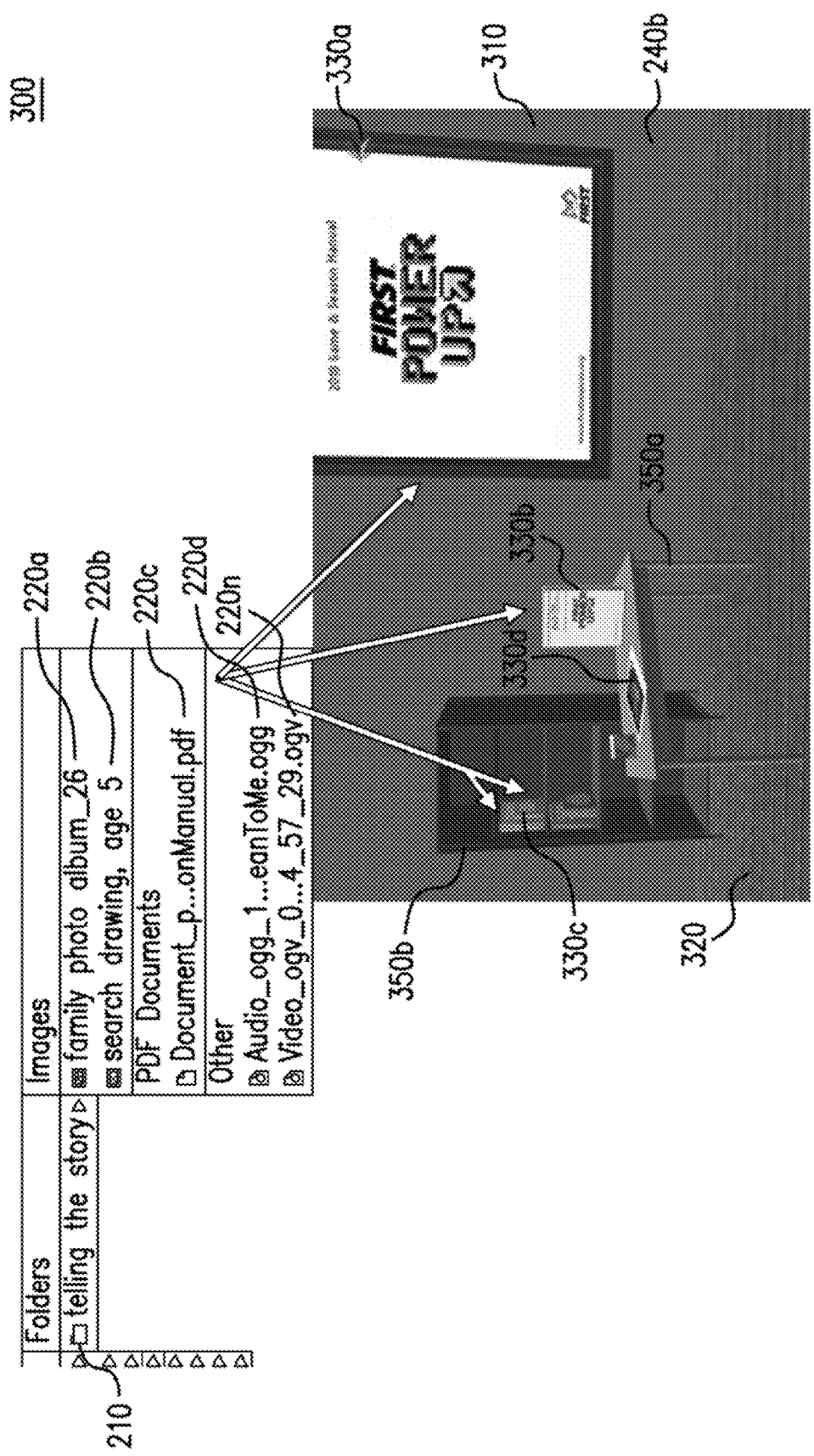
FIG. 3 shows an illustration of an example three-dimensional virtual environment configuration that includes a room.

For example, as shown in FIG. 3, a three-dimensional virtual environment configuration 300 includes a room 240b. The room 240b includes dimensions that map out a visual representation to the user of a room with the relative dimensions outlining a wall 310 and a floor 320 and so on so that room 240b is displayed to the user as a room. Room 240b includes spatial coordinates with each spatial coordinate identifying a corresponding spatial location in the three-dimensional virtual environment. In such an example, the three-dimensional object of framed poster 330a is positioned at spatial coordinates within room 240b that identify a corresponding spatial location in room 240b.

Three-dimensional virtual environment computing device 110 maps each three-dimensional object that is generated from each corresponding digital file based on the digital file parameters associated with the digital file to a corresponding set of spatial coordinates included in the three-dimensional virtual environment. Three-dimensional virtual environment computing device 110 may then spatially position each three-dimensional object at each corresponding spatial location in the three-dimensional virtual environment based on the corresponding spatial coordinates included in the three-dimensional virtual environment that each corresponding three-dimensional object is mapped.

For example, as shown in FIG. 3, framed poster 330a that is generated from the corresponding PDF document digital file 220c maps the PDF document digital file 220c based on the digital file parameters of the PDF document digital file 220c being a PDF document that includes text and images that may be executed such that the PDF document digital file 220c may be read by the user. In doing so, three-dimensional virtual computing device 110 transforms the PDF document digital file 220c to the three-dimensional object of framed poster 330a and maps framed poster 330a to the spatial coordinates included in room 240b that correspond to the position on wall 310 of room 240b that the framed poster 330a may be positioned as to depict to the user that framed poster 330a is hanging on wall 310 in room 240b. Three-dimensional virtual environment computing device 110 may then spatially position the framed poster 330a at the spatial location on wall 310 in room 240b that the framed poster 330a is mapped.

Three-dimensional virtual environment computing device 110 may transform the digital file into the three-dimensional object based on a plurality of content parameters that is indicative as to content included in the digital file when executed by the computing device. The three-dimensional object is representative of the content of the digital file when executed by the computing device. Each digital file may include content. For example, a website that is associated with soccer that includes content associated with soccer. Rather than automatically transforming the URL of the website into a book that may then be executed by the user to navigate the website with the soccer content, three-dimensional virtual environment computing device 110 may transform the digital file of the URL of the website with soccer content to a three-dimensional object of a soccer ball and/or soccer cleats. In doing so, the three-dimensional object of the soccer ball and/or soccer cleats as transformed from the digital file of the URL of the website may provide additional sensory cues to the user as to that the three-dimensional object of the soccer ball and/or soccer cleats that when executed in the three-dimensional virtual environment may open up the website with the soccer content.

Three-dimensional virtual environment computing device 110 may then spatially position the three-dimensional virtual object at a spatial location in the three-dimensional virtual environment based on the content parameters of the digital file. For example as shown in FIG. 3, three-dimensional virtual computing device 110 transforms the PDF document digital file 220c into a framed poster 330a based on the content parameters of the PDF document digital file 220c being titled "First Power Up" in that PDF document digital file 220c includes content associated with motivational speaking. In doing so, three-dimensional virtual computing device 110 may then spatially position the framed poster 330a at a spatial location on wall 310 in room 240a to display and/or advertise the content of motivational speaking to provide additional sensory cues to the user with the bold display and spatial location of the framed poster 330a associated with the bold content of motivational speaking.

Three-dimensional virtual environment computing device 110 may generate a plurality of three-dimensional furniture objects with each three-dimensional furniture object positioned at a corresponding spatial location associated with corresponding spatial coordinates included in the three-dimensional virtual environment. The plurality of three-dimensional furniture objects provide a plurality of positions for each three-dimensional object to be positioned on. The three-dimensional furniture objects generated by three-dimensional virtual environment computing device 110 may be objects positioned in the three-dimensional virtual environment that may serve as a three-dimensional storage mechanism for the three-dimensional objects in the three-dimensional virtual environment. In doing so, the three-dimensional objects may be positioned on and/or in the three-dimensional furniture objects such that the three-dimensional objects may be stored on and/or in the three-dimensional furniture objects in the three-dimensional virtual environment.

For example as shown in FIG. 3, three-dimensional virtual environment computing device 110 generates three-dimensional furniture objects in that three-dimensional objects may be stored on the three-dimensional furniture objects positioned in room 240b that include a table 350a, a bookshelf 350b, and wall 310. Table 350a typically provides sensory cues to the user as a furniture object that the user typically stores objects on as the typical user incorporates tables in their house, office and so on as a mechanism to store objects. Bookshelf 350b typically provides sensory cues to the user as a furniture object that the user typically stores objects such as books in their house, office, and so on as a mechanism to store objects such as books. Wall 310 typically provides sensory cues to the user as a furniture object that the user typically hangs visual objects on such as picture frames and/or posters in their house, office, and so on as a mechanism to store objects such as picture frames and/or posters and so on.

In doing so, the three-dimensional furniture objects may not only provide the user with the three-dimensional storage mechanism in which to store the three-dimensional objects but may also provide additional sensory cues to the user as to the type of three-dimensional objects that the user typically associates with storing on the corresponding three-dimensional furniture objects. The additional sensory cues provided by the three-dimensional objects may provide the user with the assistance to more easily locate digital files that have been transformed into three-dimensional objects and positioned on the three-dimensional furniture objects in the three-dimensional virtual environment.

In an embodiment, the three-dimensional furniture objects provide visual cues such that the three-dimensional virtual environment may be furnished with three-dimensional furniture objects to create context in the three-dimensional virtual environment. Such three-dimensional furniture objects may be items familiar to the user such as but not limited to items of furniture, tables, rugs, bookshelves, cupboards, walls, and/or any other type of three-dimensional furniture object that the user may associate storing three-dimensional objects on and/or in that will be apparent from those skilled in the relevant art(s) without departing from the spirit and scope of the present disclosure. Three-dimensional furniture objects may be sized and the appearance customized such that the three-dimensional furniture objects are unique to the user in order to provide the visual cues to the user as to where different three-dimensional objects may be spatially positioned in the three-dimensional virtual environment.

In addition to serving as a three-dimensional storage mechanism for the three-dimensional objects in the three-dimensional virtual environment, the three-dimensional furniture objects may also provide a spatial context to the user as the spatial position of the three-dimensional furniture objects in the three-dimensional virtual environment. As the user navigates through the three-dimensional virtual environment, the user may identify three-dimensional storage objects spatially positioned throughout the three-dimensional virtual environment that provides a spatial context to the user as to the location of different three-dimensional objects spatially positioned throughout the three-dimensional virtual environment.

For example as shown in FIG. 3, the user may identify that table 350*a* is spatially positioned in room 240*b* as the user enters room 240*b* when navigating throughout the three-dimensional virtual environment and then in doing so recognize that room 240*b* is the spatial location of the different three-dimensional objects associated with the PDF document digital file 220*c*. In an embodiment, three-dimensional virtual environment computing device 110 may generate three-dimensional furniture objects such as but not limited to statutes, plants, trees, and/or any other three-dimensional furniture object that may be spatially positioned throughout the three-dimensional virtual environment to provide the user additional spatial context to the user regarding three-dimensional virtual environment that will be apparent from those skilled in the relevant art(s) without departing from the spirit and scope of the present disclosure.

Three-dimensional virtual environment computing device 110 may then map each three-dimensional furniture object to a corresponding set of spatial coordinates included in the three-dimensional virtual environment with each spatial coordinate identifying a corresponding spatial location in the three-dimensional virtual environment. Three-dimensional virtual environment computing device 110 may then spatially position each three-dimensional furniture object at each corresponding spatial location in the three-dimensional virtual environment based on the corresponding spatial coordinates included in the three-dimensional virtual environment that each corresponding three-dimensional furniture object is mapped.

Three-dimensional virtual environment computing device 110 determines a three-dimensional furniture object that the digital file is to be positioned in the three-dimensional virtual environment. Three-dimensional virtual environment computing device 110 then transforms the digital file into the three-dimensional object based on a plurality of furniture object parameters associated with the corresponding three-dimensional furniture object that the digital file is determined to be positioned in the three-dimensional virtual environment. The furniture object parameters are specific to the three-dimensional furniture object that the furniture object parameters are associated. Three-dimensional virtual environment computing device 110 spatially positions the three-dimensional object at a spatial location in the three-dimensional virtual environment that the determined three-dimensional furniture object is mapped based on the furniture object parameters of the determined three-dimensional furniture object.

Three-dimensional furniture object parameters are specific to the three-dimensional furniture object such that the user may typically associate spatially positioning a specific type of three-dimensional furniture object on the three-dimensional furniture object based on the three-dimensional furniture object parameters of the three-dimensional furniture object. Each three-dimensional furniture object may have three-dimensional furniture object parameters that the user typically associates positioning different objects on when incorporating such furniture objects in their actual life whether that be in their home, office and so on. In doing so, the user typically gravitates positioning specific objects on specific furniture objects due to those characteristics associated with the furniture objects. Three-dimensional virtual environment computing device 110 may then incorporate those characteristics that the user associates with different furniture objects when positioning objects in their actual living environment as three-dimensional furniture object parameters associated with the different three-dimensional furniture objects positioned in the three-dimensional virtual environment.

For example as shown in FIG. 3, the three-dimensional furniture object of the frame 330*a* includes three-dimensional furniture object parameters of framing a picture and/or poster as the user typically associates a frame in their actual living environment as a furniture object that the user typically positions pictures and/or posters. The three-dimensional furniture object of the table 350*a* includes three-dimensional furniture object parameters of having a flat surface that the user typically associates a table in their actual living environment as a furniture object that the user typically positions object on the surface of the table in a manner that the user typically views as a temporary placement in that the user is typically positioning the object on the table with the intent to return to the table for the object in an abbreviated period of time. Three-dimensional furniture object of the bookshelf 350*b* includes three-dimensional furniture object parameters as a furniture object that the user typically associates a bookshelf in their actual living environment that the user typically positions objects and/or books on the bookshelf with the intent of storing the books on the bookshelf for an extended period of time.

Three-dimensional virtual environment computing device 110 may then transform the digital file into the three-dimensional object based on the furniture object parameters associated with the corresponding three-dimensional furniture object that the digital file is determined to be positioned in the three-dimensional virtual environment. Three-dimensional virtual environment computing device 110 may determine based on the furniture object parameters of the three-dimensional furniture object that the three-dimensional object is to be transformed into a three-dimensional object that is an object that is typically positioned on the furniture object in an actual living environment. In doing so, three-dimensional virtual environment computing device 110 may automatically transform the digital file into the appropriate three-dimensional object that is appropriate to be positioned on the three-dimensional furniture object.

For example as shown in FIG. 3, PDF document digital file 220*c* is a digital file that is transformed into different three-dimensional objects based on the furniture object parameters of the corresponding three-dimensional furniture object that PDF document digital file 220*c* is spatially positioned. In such an example, three-dimensional virtual environment computing device 110 may automatically transform PDF document digital file 220*c* into the three-dimensional object of framed poster 330*a* when PDF document digital file 220*c* is spatially positioned on the three-dimensional furniture object of wall 310 of room 240*b*. Three-dimensional virtual environment computing device 110 may identify the furniture object parameters of wall 310 as of being a flat vertical surface in room 240*b* as being a three-dimensional furniture object that the user typically associates with positioning a framed picture. In doing so, three-dimensional environment computing device 110 may automatically transform PDF document digital file 220*c* into the three-dimensional object of framed poster 330*a* and may spatially position framed poster 330*a* on wall 310 to display framed poster 330*a* in the three-dimensional virtual environment.

In such an example, three-dimensional virtual environment computing device 110 may automatically transform PDF document digital file 220*c* into the three-dimensional object into the three-dimensional object of an upright positioned book 330*b* when PDF document digital file 220*c* is spatially positioned on the three-dimensional furniture object of table 350*a* of room 240*b*. Three-dimensional virtual environment computing device 110 may identify the furniture object parameters of table 350*a* as being a table with a flat horizontal surface as being a three-dimensional furniture object that the user typically associates with temporarily positioning a book in an upright position so that the user may return to table 350*a* to obtain book 330*b* in an abbreviated period of time. Three-dimensional virtual environment computing device 110 may automatically transform PDF document digital file 220*c* into the three-dimensional object of upright positioned book 330*b* and may spatially position on table 350*a* such that the user may easily identify book 330*b* positioned on table 350*a* and return to PDF document digital file 220*c* in an abbreviated period of time.

In such an example, three-dimensional virtual environment computing device 110 may automatically transform PDF document digital file 220*c* into the three-dimensional object of book 330*c* when PDF document digital file 220*c* is spatially positioned on the three-dimensional furniture object of bookshelf 350*b* of room 240*b*. Three-dimensional virtual environment computing device 110 may identify the furniture object parameters of bookshelf 350*b* as being a bookshelf with several shelves that the user typically associates with storing a book for an extended period of time. Three-dimensional virtual environment computing device 110 may automatically transform PDF document digital file 220*c* into the three-dimensional object of book 330*c* and may spatially position on bookshelf 350*b* such that the user may store book 330*c* on bookshelf 350*b* and return to PDF document digital file 220*c* in an extended period of time.

In another example, three-dimensional virtual environment computing device 110 may automatically transform a digital file of a URL into the three-dimensional object of book 330*c* when the URL is spatially positioned on the three-dimensional furniture object of bookshelf 350*b* of room 240*b* due to the furniture object parameters of bookshelf 350*b*. Three-dimensional virtual environment computing device 110 may then automatically transform the digital file of the URL into the three-dimensional object of a polaroid 330*d* when the URL is spatially positioned on the three-dimensional furniture object of table 350*a* of room 240*b* due to the furniture object parameters of table 350*a*. Three-dimensional virtual environment computing device 110 may then automatically transform the digital file of the URL into the three-dimensional object of framed picture 330*a* when the URL is spatially positioned on the three-dimensional furniture object of wall 310 of room 240*b* due to the furniture object parameters of wall 310 and so on.

Three-dimensional virtual environment computing device 110 may transform the digital file into the three-dimensional object based on the metadata embedded in the digital file and associated with digital file parameters. The metadata associated with the digital file parameters is indicative as to the visual representation of the digital file when executed by the computing device. Three-dimensional virtual environment computing device 110 may then spatially position the three-dimensional object at the spatial location in the three-dimensional virtual environment based on the metadata associated with the digital file parameters of the digital file.

The metadata that is embedded in the digital file may be indicative as to the visual representation of the digital file when executed by the computing device. For example, the metadata of the digital file may be indicative that the digital file is a PDF document with a specified amount of pages included in the PDF document. The digital file of the PDF document when executed by the computing device may display the PDF document to the user with the specified amount of pages included in the PDF document. In such an example, three-dimensional virtual environment computing device 110 may transform the digital file of the PDF document into the three-dimensional object of the book in which the book is displayed in three-dimensional virtual environment with a thickness that is representative of the amount of pages included in the PDF document. In such an example, three-dimensional virtual environment computing device 110 may transform the digital file of the PDF document into a three-dimensional object of the book that has a greater thickness and/or pages as displayed in the three-dimensional virtual environment for a digital file of the PDF document that has 100 pages as compared to a different digital file of a PDF document that has 10 pages.

In doing so, the metadata embedded in the digital file may further enhance the display of the three-dimensional object in the three-dimensional virtual environment that the digital file is transformed as compared to other digital files with different embedded metadata. In another example, three-dimensional virtual environment computing device 110 may transform the digital file of an electronic book into the three-dimensional object of the book in which the book is displayed in the three-dimensional virtual environment with a color that is representative of color of the cover of the electronic book. In such an example, three-dimensional virtual environment computing device 110 may transform the digital file of the electronic book into a three-dimensional object of the book that has a specified color that is representative of the color of the cover of the electronic book as compared to a different electronic book with a different color of the cover.

Three-dimensional virtual environment computing device 110 may transform the digital file into the three-dimensional object based on metadata embedded in the determined three-dimensional furniture object and associated with the furniture object parameters. The metadata associated with the furniture object parameters are specific to the three-dimensional furniture object that the furniture object parameters are associated. Three-dimensional virtual environment computing device 110 may then spatially position the three-dimensional object at the spatial location in the three-dimensional virtual environment based on the metadata associated with the furniture object parameters embedded in the determined three-dimensional furniture object.

The metadata embedded in the digital file when associated with the furniture object parameters of the determined three-dimensional furniture object to position the transformed digital file into the three-dimensional object may trigger three-dimensional virtual environment computing device 110 to transform the digital file into the three-dimensional object. For example, three-dimensional virtual environment computing device 110 may identify the metadata of the digital file of an image as being an image. The user may then request to spatially position the digital file of the image on a three-dimensional furniture object of a table. Three-dimensional virtual environment computing device 110 may identify the furniture object parameters of the table as positioning three-dimensional objects on the table to be displayed in the three-dimensional virtual environment. However, such furniture object parameters of the table do not accommodate the positioning of a large framed picture on the table. Rather, the furniture object parameters of the table accommodate the positioning of smaller pictures on the table, such as polaroid pictures. In doing so, three-dimensional virtual environment computing device 110 may transform the digital file of the image in to polaroid pictures due to the furniture object parameters of the table such that the digital file of the image is displayed in three-dimensional virtual environment as three-dimensional objects of polaroid pictures positioned on the table.

In such an example, the user may then request to spatially the position the digital file of the image on a three-dimensional furniture object of a wall. Three-dimensional virtual environment computing device 110 may identify the furniture object parameters of the wall as positioning three-dimensional objects to be hung on the wall to be displayed in three-dimensional virtual environment. However, such furniture object parameters of the wall do not accommodate the positioning of small polaroid pictures on the wall. Rather, the furniture object parameters of the wall accommodate the positioning of a larger framed picture on the wall. In doing so, three-dimensional virtual environment computing device 110 may transform the digital file of the image into the framed picture due to the furniture object parameters of the wall such that the digital file of the image is displayed in three-dimensional virtual environment as the three-dimensional object of the framed picture positioned on the wall.

Three-dimensional virtual environmental computing device 110 may also organize the numerous different three-dimensional objects as spatially positioned on a corresponding furniture object in the three-dimensional virtual environment based on the metadata embedded in the corresponding digital files. Three-dimensional virtual environmental computing device 110 may identify from the metadata embedded in in the corresponding digital files different approaches to organize the digital files as transformed into corresponding three-dimensional objects as the three-dimensional objects are spatially positioned on the corresponding furniture object in the three-dimensional virtual environment. For example, three-dimensional virtual environmental computing device 110 may organize numerous different books that are positioned on a bookshelf based on the alphabetical order of the title of the corresponding digital files that are transformed into the three-dimensional objects of the books based on the metadata embedded in the digital files. In another example, three-dimensional virtual environmental computing device 110 may organize numerous different books that are positioned on the bookshelf based on the chronological order in which the corresponding digital files were created that are transformed into the three-dimensional objects of the books based on the metadata embedded in the digital files.

In an embodiment, three-dimensional virtual environment computing device 110 may display to the user metadata embedded in the digital file that is associated with the particular three-dimensional object when the user navigates to the three-dimensional object. In such an embodiment, metadata embedded in the digital file that is associated with the three-dimensional object may include a summary and/or description of the digital file associated with the three-dimensional object. Three-dimensional virtual environment computing device 110 may then automatically display the summary and/or description provided by the metadata embedded in the digital file that is associated with the three-dimensional object when the user engages the three-dimensional object. For example, three-dimensional virtual computing device 110 may display a summary of PDF file that is associated with a three-dimensional object of a book when the user engages the book in the three-dimensional virtual environment.

Examples of Digital Files Transformed into Three-Dimensional Objects

Figure 4:
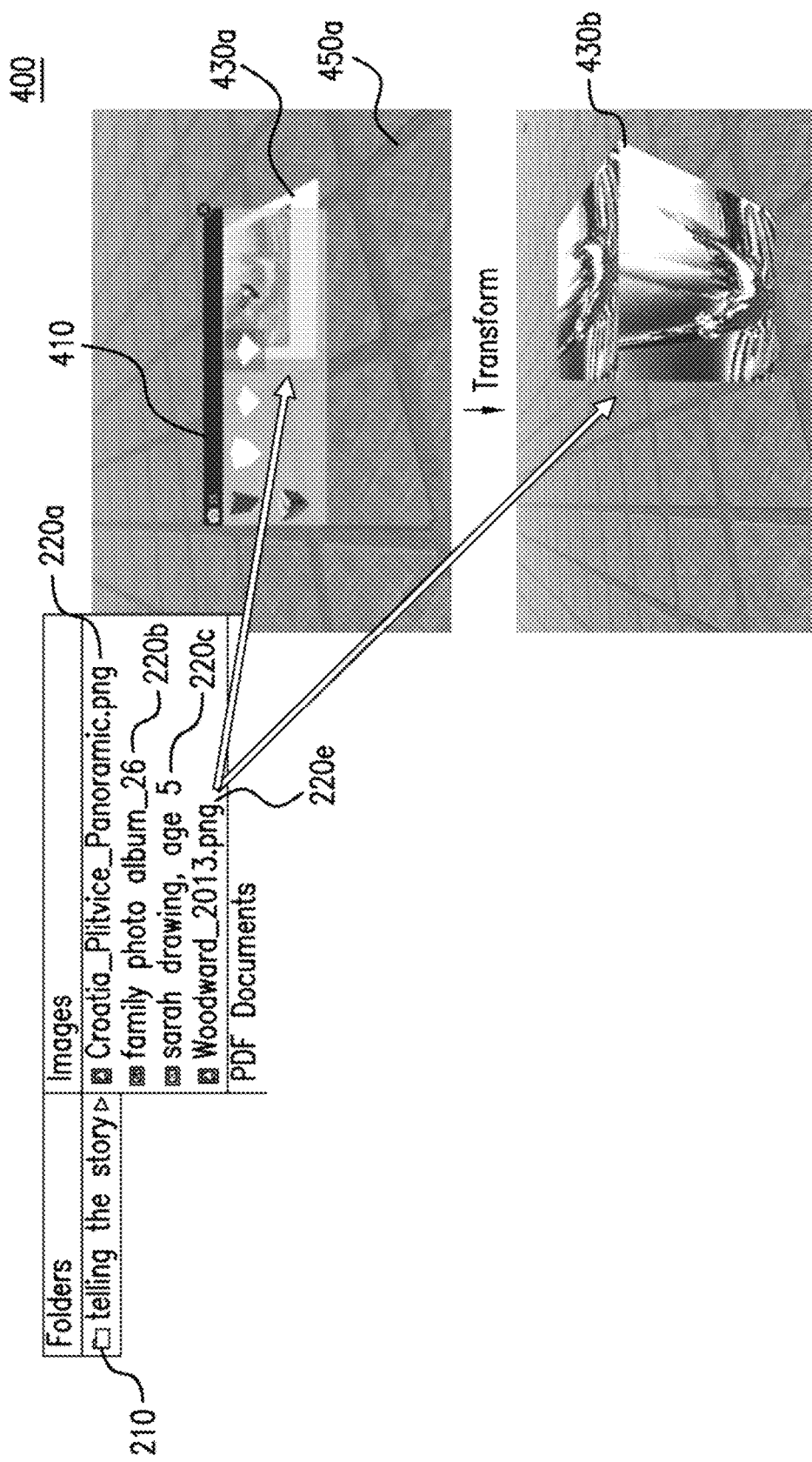
FIG. 4 shows an illustration of an example three-dimensional virtual environment configuration that includes a file folder and includes a digital file that includes an image.

FIG. 4 depicts an example three-dimensional virtual environment configuration 400 that includes file folder 210 and includes a "Woodward 2013" digital file 220*e* that includes an image of a 2013 Woodward work. Three-dimensional virtual environment computing device 110 may transform the "Woodward 2013" digital file 220*e* from the digital file that when executed by the computing device depicts the image of the 2013 Woodward work to a three-dimensional object of a polaroid 430*a* due to the positioning of the "Woodward 2013" digital file 220*e* on a horizontal furniture object in the floor 450*a* of the three-dimensional virtual environment. The digital file parameters of the "Woodward 2013" digital file 220*e* being an image and the furniture object parameters of the floor 450*a* being a horizontal surface triggers three-dimensional virtual environment computing device 110 to transform the "Woodward 2013" digital file 220*e* into the three-dimensional object of the polaroid 430*a*.

Three-dimensional virtual environment computing device 110 may then enable the user to select to change the initial three-dimensional object of the polaroid 430*a* for the "Woodward_2013" digital file 220*e* to a three-dimensional object of a free-standing picture frame 430*b* that depicts the image of the 2013 Woodward work. In such an example, the user may customize the three-dimensional object that the digital file is transformed to by three-dimensional virtual environment computing device 110 by engaging a pallet 410. Pallet 410 may depict to the user the different options of three-dimensional objects that three-dimensional virtual environment computing device 110 may transform the digital file into and spatially position in the three-dimensional virtual environment. In doing so, the user may customize the three-dimensional object that the digital file is transformed into by three-dimensional virtual environment computing device 110.

Figure 5:
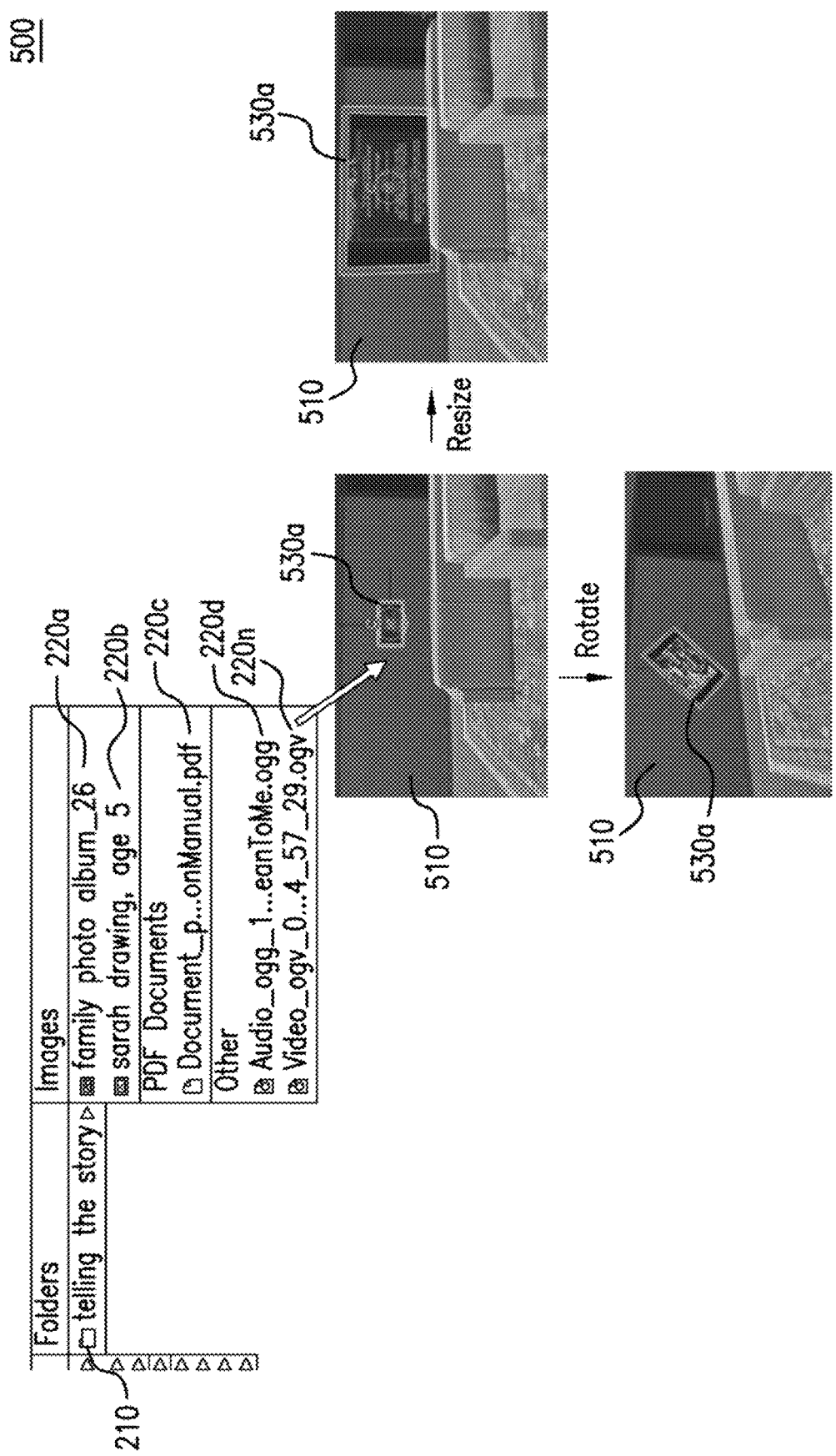
FIG. 5 shows an illustration of an example three-dimensional virtual environment configuration that includes a file folder and includes a digital file that includes a video file.

FIG. 5 depicts an example three-dimensional virtual environment configuration 500 that includes file folder 210 and includes a "video.ogv" digital file 220n that includes a video file. Three-dimensional environment computing device 110 may transform the "video.ogv" digital file 220n from the digital file when executed by the computing device depicts the video to a three-dimensional object of a framed picture 530a due to the positioning of the "video.ogv" digital file 220n on a vertical furniture object in the wall 510 of the three-dimensional virtual environment. The digital file parameters of "video.ogv" digital file 220n being a video and the furniture object parameters of the wall 510 being a vertical surface triggers three-dimensional virtual environment computing device 110 to transform "video.ogv" digital file 220n into the three-dimensional object of the framed picture 530a the depicts the opening credits of the video. Three-dimensional virtual environment computing device 110 may then enable the user to select to change the initial spatial positioning of the three-dimensional object of the framed picture 530a for the "video.ogv" digital file 220n. In such an example, the user may customize the spatial positioning of the three-dimensional object on the wall 510 by resizing the framed picture 530a and/or rotating the framed picture 530a as spatially positioned on the wall 510 in the three-dimensional virtual environment. In doing so, the user may customize the spatial position of the three-dimensional object that the digital file is transformed into by three-dimensional virtual environment computing device 110.

Figure 6:
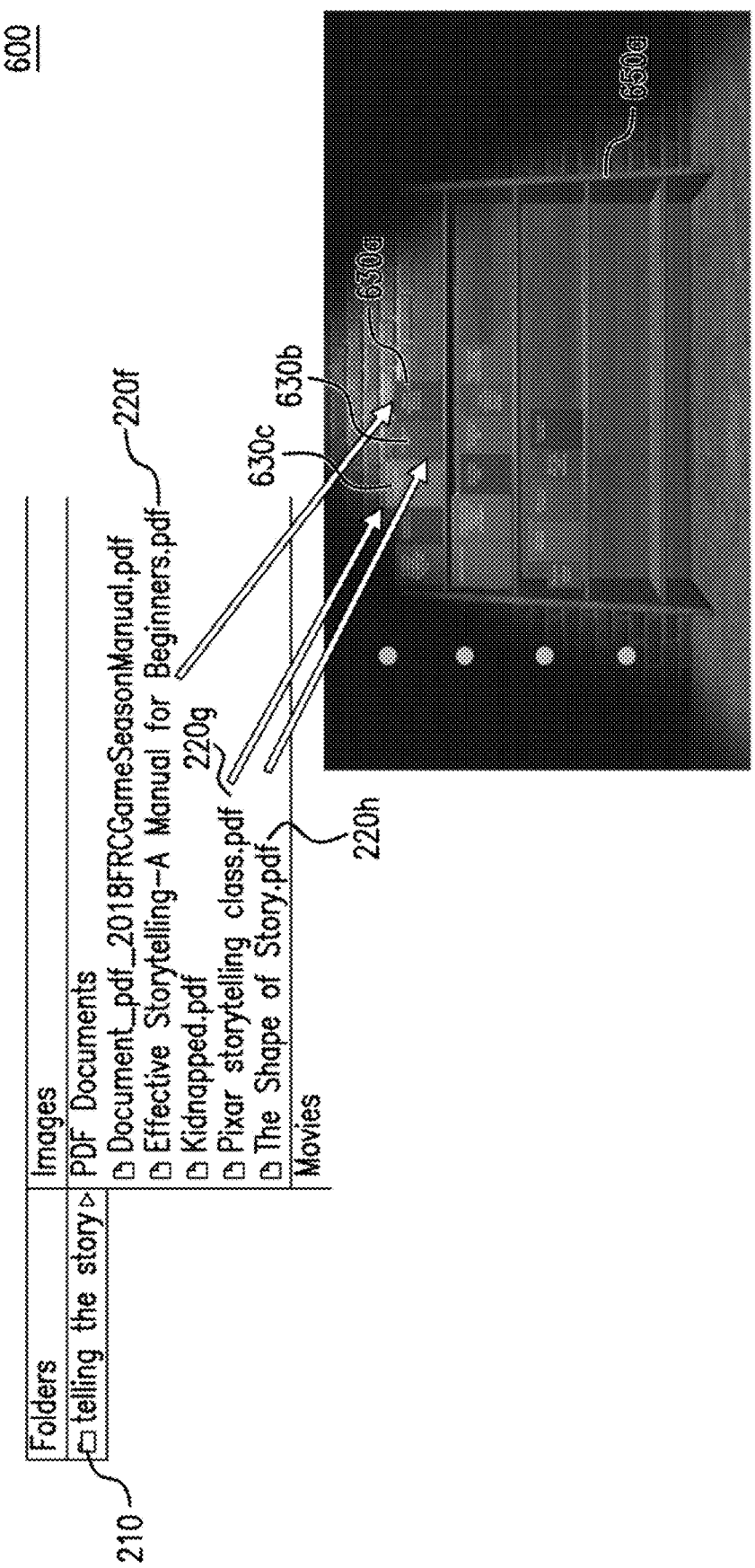
FIG. 6 shows an illustration of an example three-dimensional virtual environment configuration that includes a file folder and includes a digital files that include PDF files.

FIG. 6 depicts an example three-dimensional virtual environment configuration 600 that includes file folder 210 and includes an "Effective Storytelling" digital file 220f that includes a PDF file, a "Pixar Storytelling Class" digital file 220g that includes a PDF file, and a "Shape of the Story" digital file 220h that includes a PDF file. Three-dimensional environment computing device 110 may transform the "Effective Storytelling" digital file 220f from the digital file when executed by the computing device that depicts the PDF to a three-dimensional object of a book 630a when positioned on the shelf of the furniture object of the bookshelf 650a. Three-dimensional environment computing device 110 may transform the "Effective Storytelling" digital file 220f to the book 630a such that the book 630a has the color and size and thickness as spatially positioned on the bookshelf 650a based on the metadata embedded in the "Shape of the Story" digital file 220h.

Three-dimensional environment computing device 110 may transform the "Pixar Storytelling Class" digital file 220g from the digital file when executed by the computing device that depicts the PDF to a three-dimensional object of a book 630b when positioned on the shelf of the furniture object of the bookshelf 650a. Three-dimensional environment computing device 110 may transform the "Pixar Storytelling Class" digital file 220g to the book 630b such that the book 630b has the color and size and thickness as spatially positioned on the bookshelf 650a based on the metadata embedded in the "Pixar Storytelling Class" digital file 220g.

Three-dimensional environment computing device 110 may transform the "Shape of the Story" digital file 220h from the digital file when executed by the computing device that depicts the PDF to a three-dimensional object of a book 630c when positioned on the shelf of the furniture object of the bookshelf 650a. Three-dimensional environment computing device 110 may transform the "Shape of the Story" digital file 220h to the book 630c such that the book 630c has the color and the size and thickness as spatially positioned on the bookshelf 650a based on the metadata embedded in the "Shape of the Story" digital file 220h. Three-dimensional environment computing device 110 may then spatially position each of the books 630a, 630b, and 630c such that each of the books 630a, 630b, and 630c are positioned in an order on the book bookshelf 650a based on the metadata embedded in each o of the corresponding digital files. For example, three-dimensional environment computing device 110 may position each of the books 630a, 630b, and 630c in chronological order in when each of the corresponding digital files were generated.

Figure 7:
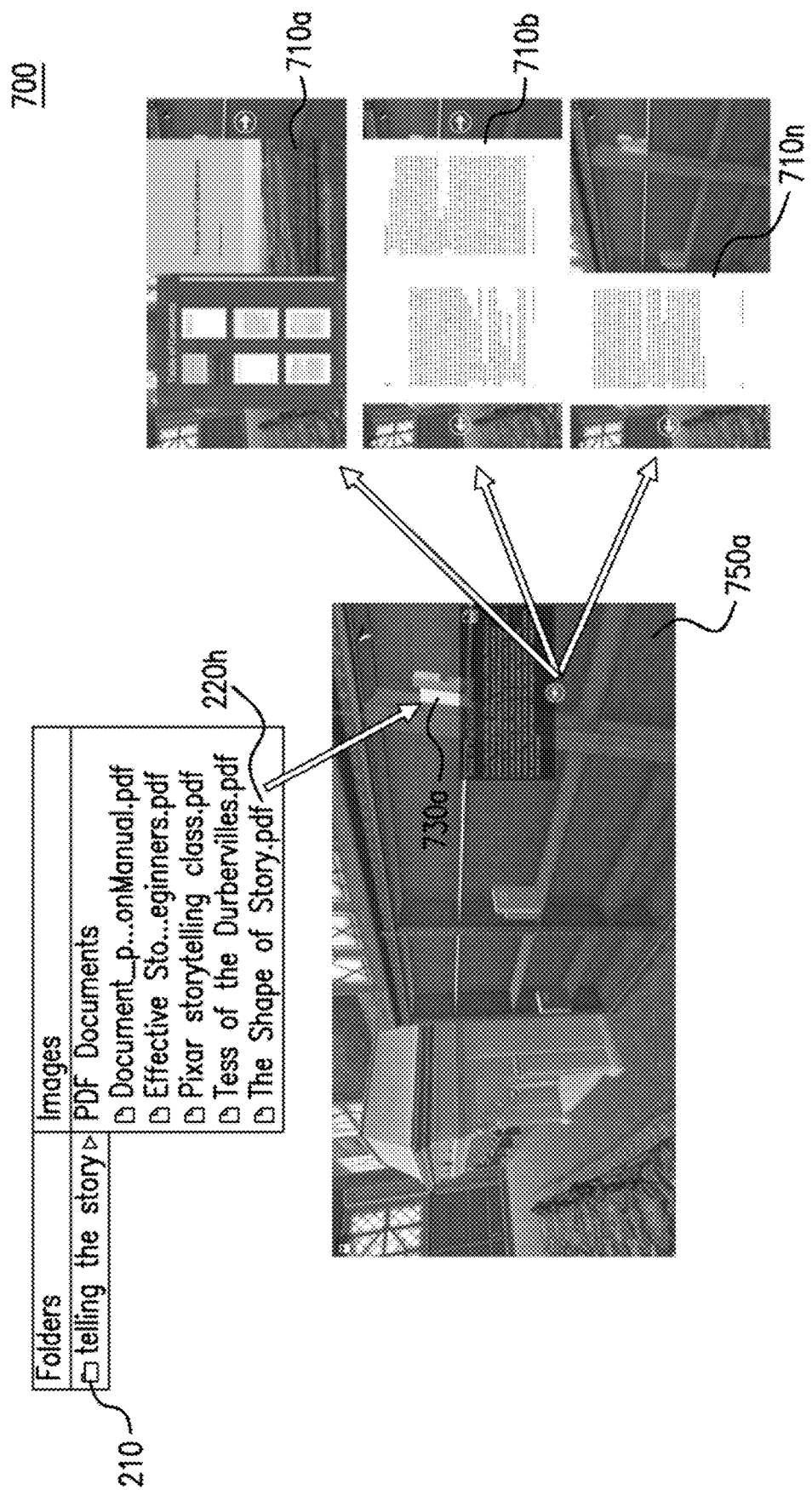
FIG. 7 shows an illustration of an example three-dimensional virtual environment configuration that includes a file folder and includes a digital file that includes a PDF file.

FIG. 7 depicts an example three-dimensional virtual environment configuration 700 that includes file folder 210 and includes the "Shape of the Story" digital file 220h that includes a PDF file. Three-dimensional virtual environment computing device 110 may transform the "Shape of the Story" digital file 220h from the digital file when executed by the computing device that depicts the PDF to a three-dimensional object of a book 730a when positioned on the shelf of the furniture object of the bookshelf 750a. The user may then request that three-dimensional virtual environment computing device 110 executes the three-dimensional object of the book 730a in the three-dimensional virtual environment in a similar manner as when the user requests the computing device to execute the "Shape of the Story" digital file 220h. In doing so, three-dimensional virtual environment computing device 110 may display to the user the different pages of the PDF file of the "Shape of the Story" digital file 220h as requested by the user as the user engages the three-dimensional object of the book 730a. For example, three-dimensional virtual environment computing device 110 may display to the user the title page and table of contents 710a when the user requests to view those pages. Three-dimensional virtual environment computing device 110 may then display to the user the additional pages 710b and 710n when the user request to view those pages. In doing so, the user may engage book 730a via the three-dimensional virtual environment in a similar manner as when the user engages the "Shape of the Story" digital file 220h.

Figure 8:
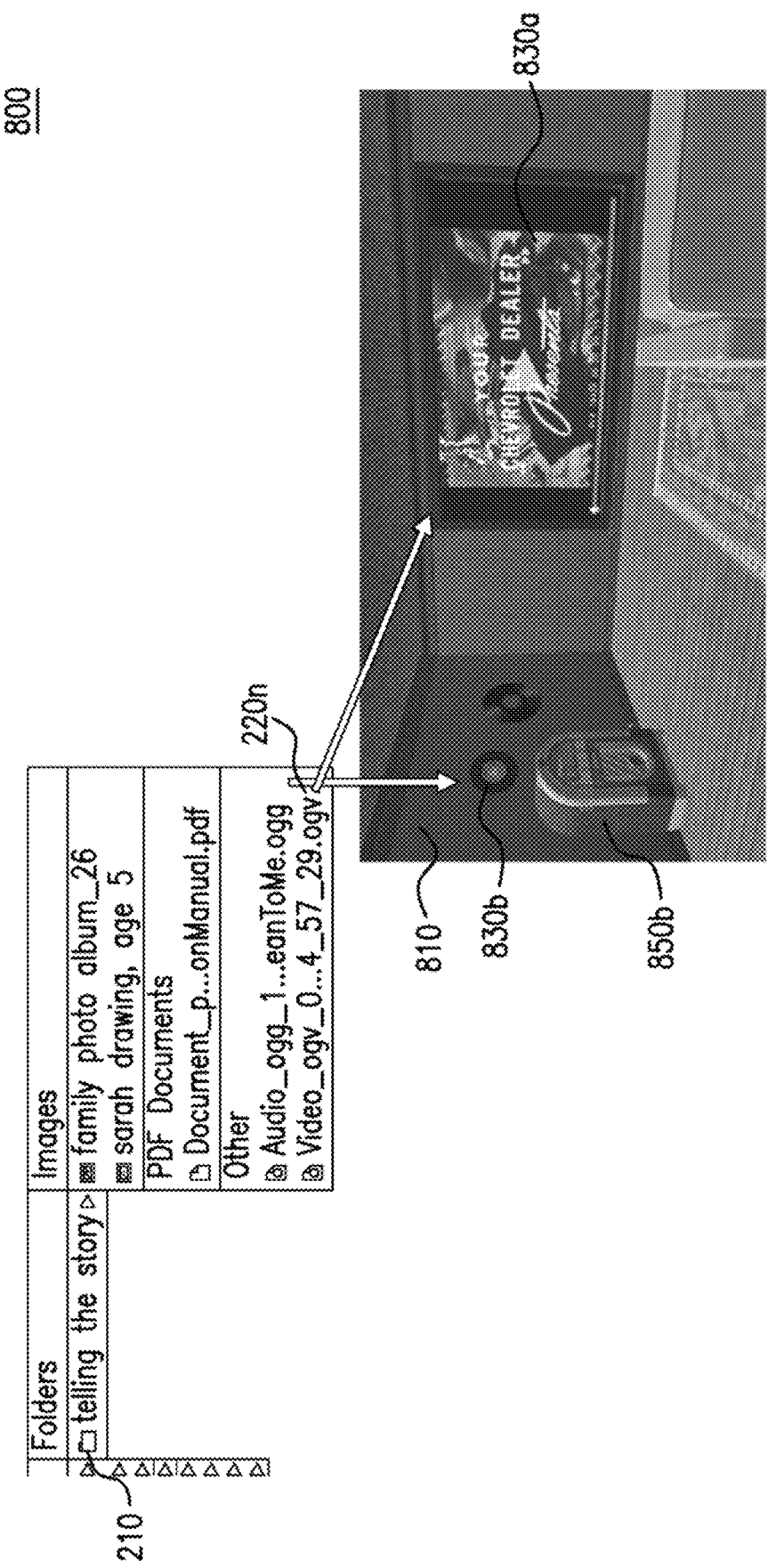
FIG. 8 shows an illustration of an three-dimensional virtual environment configuration that includes a file folder and includes a digital file that includes a video file.

FIG. 8 depicts an example three-dimensional virtual environment configuration 800 that includes file folder 210 and includes the "video.ogv" digital file 220n that includes a video file. Three-dimensional environment computing device 110 may transform the "video.ogv" digital file 220n from the digital file when executed by the computing device that depicts the video to a three-dimensional object of a television 830a when positioned on the furniture object of the wall 810 due to the digital file parameters of the "video.ogv" digital file 220n being a video and the furniture object parameters of the wall 810 in being a wall that a television may be hung. In doing so, three-dimensional environment computing device 110 may transform the "video.ogv" digital file 220n to a television 830a spatially positioned on the wall 810 that plays the video.

Three-dimensional environment computing device 110 may also transform an audio file from the digital file when executed by the computing device that depicts the audio to a three-dimensional object of a record 830b when positioned on the furniture object of the wall 810 due to the digital file parameters of the audio file being an audio recording and the furniture object parameters of the wall 810 in being a wall that a record 830b may be hung. In doing so, three-dimensional environment computing device 110 may transform the audio file to a record 830b spatially positioned on the wall 810. Three-dimensional environment computing device 110 may also transform the audio file to be displayed on the playlist of the furniture object of a jukebox 850b when poisoned on the furniture object of the jukebox 850*b* due to the digital file parameters of the audio file being an audio recording and the furniture object parameters of the jukebox 850*b* in being a jukebox that may play the audio file. In doing so, three-dimensional environment computing device 110 may transform the audio file to be played and/or displayed by the jukebox 850*b*.

In an embodiment, three-dimensional environment computing device 110 may spatialize the execution of the audio file and/or video file based on the position of the user in the three-dimensional virtual environment relative to the corresponding three-dimensional objects that are associated with the audio file and/or video file in the three-dimensional virtual environment. As the user navigates throughout the three-dimensional virtual environment, the position of the navigation of the user in the three-dimensional virtual environment may become within a threshold distance of a corresponding three-dimensional object associated with the audio file and/or digital file in the three-dimensional virtual environment. In doing so, three-dimensional environment computing device 110 may automatically execute the audio file and/or digital file associated with the three-dimensional object that the positon of the user in the three-dimensional virtual environment has become within the threshold distance of the three-dimensional object associated with the audio file and/or digital file.

For example as shown in FIG. 8, the position of the user may be in the three-dimensional virtual environment that includes the three-dimensional object of the television 830*a* and the three-dimensional object of the record 830*b*. As the position of the user in the three-dimensional virtual environment approaches the three-dimensional object of the television 830*a* and becomes within the threshold distance of the television 830*a*, the three-dimensional environment computing device 110 may automatically execute the "video.ogv" digital file 220*n* via the television 830*a* such that the television 830*a* may display the video encoded in the "video.ogv" digital file 220*n*. In doing so, the user may automatically view the display of the video encoded in the "video.ogv" digital file 220*n* due to the position of the user in the three-dimensional virtual environment being within the threshold distance of the television 830*a*.

As the position of the user in the three-dimensional virtual environment moves outside of the threshold distance from the three-dimensional object associated with the audio and/or digital file, three-dimensional virtual environment computing device 110 may then automatically deactivate the execution of the audio file and/or digital file associated with the three-dimensional virtual object such that the audio file and/or digital file is no longer played by the corresponding three-dimensional object. For example, as shown in FIG. 8, the position of the user in the three-dimensional virtual environment may move from being within the threshold distance of the television 830*a* to outside of the threshold distance of the television 830*a*. In doing so, three-dimensional virtual environment computing device 110 may automatically deactivate the execution of the "video.ogv" digital file 220*n* such that television 830*a* terminates the display of the video encoded in the "video.ogv" digital file 220*n*. However, in such an example, the position of the user in the three-dimensional virtual environment may move from within the threshold distance of the television 830*a* to the within the threshold distance of the record 830*b*. In doing so, three-dimensional virtual environment computing device 110 may then automatically activate the execution of the audio file via record 830*b* such that the record 830*b* may play the audio encoded in the audio file. In doing so, the user may automatically listen to the audio encoded in the audio file due to the position of the user in the three-dimensional virtual environment being within the threshold distance of the record 830*b*.

Figure 9:
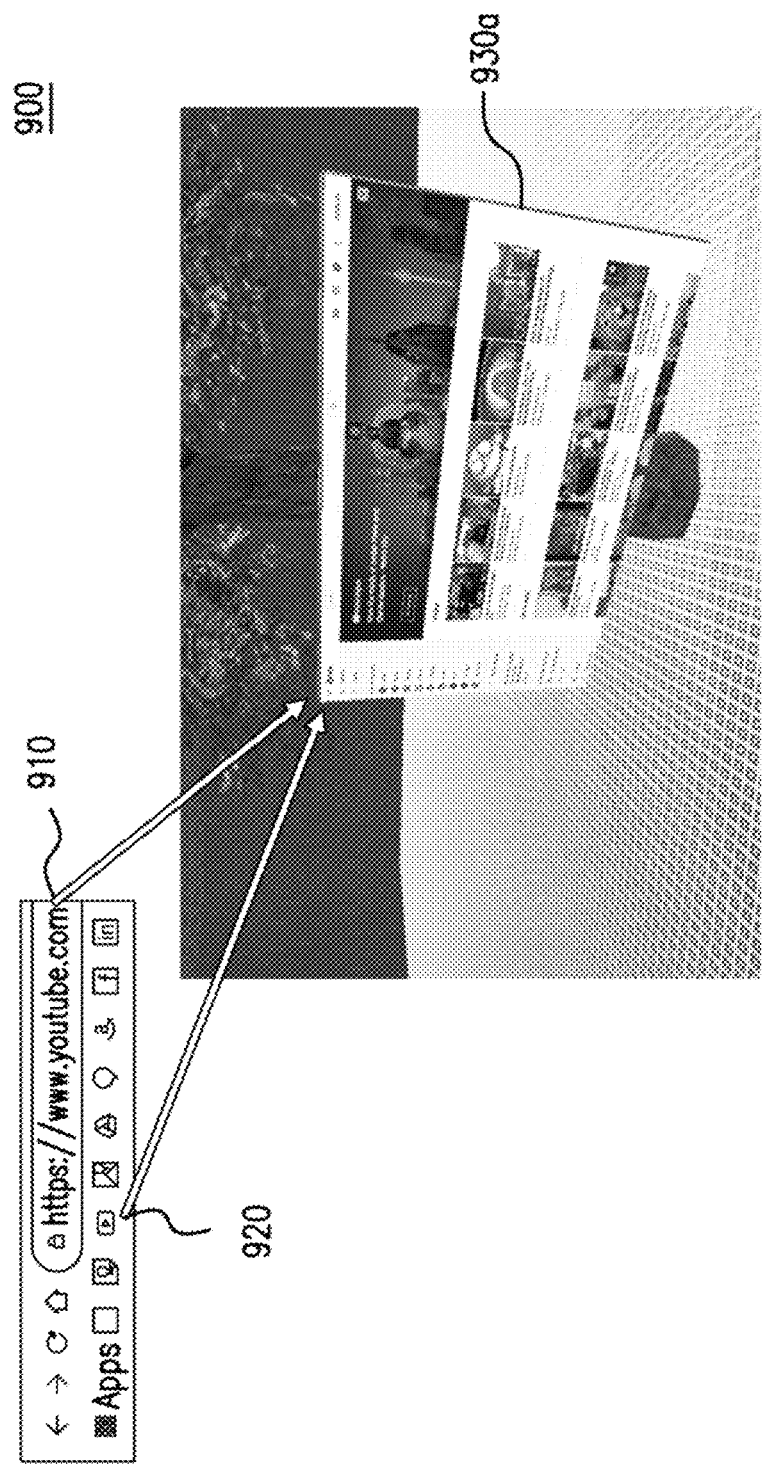
FIG. 9 shows an illustration of an example three-dimensional virtual environment configuration that includes a URL and/or an existing bookmark that the user requests to transform into a three-dimensional object and store in the three-dimensional virtual environment.

FIG. 9 depicts an example three-dimensional virtual environment configuration 900 that includes a URL 910 and/or an existing bookmark 920 that the user requests to transform into a three-dimensional object of a tablet 930*a* and store in the three-dimensional virtual environment. Three-dimensional environment computing device 110 may transform the web page from the digital file when executed by the computing device that depicts the web page to a three-dimensional object of an interactive web tablet 930*a* when positioned on a vertical flat surface such as a wall due to the digital file parameters of the web page being a visible and interactive display of the content of the web page and the furniture object parameters vertical surface of the wall. In doing so, three-dimensional environment computing device 110 may transform the digital file of the web page to a tablet 930*a* spatially positioned on a wall that enables the user to interact with the web page.

In an embodiment, three-dimensional virtual environment computing device 110 may enable the user to engage the digital file of a web page that has been transformed into a three-dimensional object and spatially positioned in the three-dimensional virtual environment via the three-dimensional virtual environment. Conventionally, the user may engage the web page via a web browser and in doing so may navigate throughout the web page via the web browser. For example, the user may navigate throughout the web page of YouTube based on the URL of YouTube via the web browser. In such an embodiment, three-dimensional virtual environment computing device 110 may convert the web page into a three-dimensional object and spatially position in the three-dimensional virtual environment. In doing so, the user may engage the web page as transformed into the three-dimensional object via the three-dimensional virtual environment.

For example as shown in FIG. 9, three-dimensional virtual environment computing device 110 may transform the URL 910 into the three-dimensional object of the interactive web tablet 930*a*. The user may then engage the interactive web tablet 930*a* in the three-dimensional virtual environment configuration 900 such that the user may engage the URL 910 via the interactive web tablet 930*a* as if the user engaged the URL 910 in a web browser. In such an example, the user may search the URL 910 of YouTube and open any of the media content items posted on YouTube and view and/or stream such media content items via interactive web tablet 930*a* in the three-dimensional virtual environment configuration 900. In doing so, the user may engage the interactive web tablet 930*a* and select a media content item available on YouTube and may stream the selected media content item such that the user may view and/or listen to the streaming of the media content item via the interactive web tablet 930*a* positioned in the three-dimensional virtual environment configuration 900. Thus, the user may engage the URL 910 as transformed into the interactive web tablet 930*a* in a similar manner as if the user engaged the URL 910 via a web browser.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. A three-dimensional conversion digital file system for transforming a digital file into a three-dimensional object that is spatially positioned in a three-dimensional virtual environment to visually organize the digital file relative to the three-dimensional virtual environment, comprising:
at least one processor; and
a memory coupled with the processor, the memory including instructions that when executed by the processor cause the processor to:
receive the digital file that includes a plurality of digital file parameters and is in a file format that is encoded for storage in a two-dimensional hierarchy of file folders of a digital storage medium that the digital file is previously stored, wherein the digital file parameters are indicative as to a presentation of the digital file when executed by a computing device,
transform the digital file into the three-dimensional object based on the digital file parameters associated with the digital file thereby providing a user with a visual context of content included in the digital file when executed by the computing device based on a plurality of visual characteristics of the transformed three-dimensional object, wherein the plurality of visual characteristics is displayed by the three-dimensional object that provides the visual context of the content included in the digital file to the user when executed by the computing device,
identify a spatial position of the three-dimensional object at a spatial location in the three-dimensional virtual environment based on the digital file parameters of the digital file thereby providing the user with a visual context of a location of the digital file within the three-dimensional virtual environment as transformed into the three-dimensional object relative to a plurality of digital files positioned within the three-dimensional virtual environment as transformed into a plurality of three-dimensional objects,
spatially position the three-dimensional object at the spatial location in the three-dimensional virtual environment based on a plurality of spatial coordinates of the three-dimensional virtual environment thereby identifying the spatial location in the three-dimensional virtual environment that provides the visual context of the location of the digital file as transformed into the three-dimensional object within the three-dimensional virtual environment relative to the plurality of digital files transformed into the plurality of three-dimensional objects, and
enable the user to engage the three-dimensional object as spatially positioned in the three-dimensional virtual environment as requested by the user so that the three-dimensional object is executed in the three-dimensional virtual environment, wherein execution of the digital file by the computing device is transferred to execution of the three-dimensional object in the three-dimensional virtual environment.

2. The three-dimensional conversion digital file system of claim 1, wherein the processor is further configured to:
transform the digital file into the three-dimensional object based on a plurality of content parameters that is indicative as to a content included in the digital file when executed by the computing device, wherein the three-dimensional object is representative of the content of the digital file when executed by the computing device; and
spatially position the three-dimensional object at a spatial location in the three-dimensional virtual environment based on the content parameters of the digital file.

3. The three-dimensional conversion digital file system of claim 1, wherein the processor is further configured to:
enable the user to browse a plurality of digital files with each of the digital files stored in a plurality of digital storage mediums in a plurality of file formats and select each digital file stored in each corresponding digital storage medium in each corresponding file format;
transform each selected digital file as stored in each corresponding digital storage medium in each corresponding file format to a corresponding three-dimensional object based on the corresponding digital file parameters associated with each corresponding selected digital file; and
spatially position each corresponding three-dimensional object at a corresponding spatial location in the three-dimensional virtual environment based on the corresponding digital file parameters of each corresponding selected digital file.

4. The three-dimensional conversion digital file system of claim 3, wherein the processor is further configured to:
automatically select each digital file stored in a specified digital storage medium in the plurality of file formats;
transform each digital file stored in the specified digital storage medium in each corresponding file format to a corresponding three-dimensional object based on the corresponding digital file parameters associated with each digital file stored on the specified digital storage medium;
spatially position each corresponding three-dimensional object at a corresponding spatial location in the three-dimensional virtual environment based on the corresponding digital file parameters of each corresponding digital file stored in the specified storage medium.

5. The three-dimensional conversion digital file system of claim 4, wherein the processor is further configured to:
generate the three-dimensional virtual environment that includes a plurality of dimensions that maps out visual representation of the three-dimensional virtual environment as displayed to the user, wherein the three-dimensional virtual environment includes a plurality of spatial coordinates with each spatial coordinate identifying a corresponding spatial location in the three-dimensional virtual environment;
map each three-dimensional object that is generated from each corresponding digital file based on the digital file parameters associated with the digital file to a corresponding set of spatial coordinates included in the three-dimensional virtual environment; and spatially position each three-dimensional object at each corresponding spatial location in the three-dimensional virtual environment based on the corresponding spatial coordinates included in the three-dimensional virtual environment that each corresponding three-dimensional object is mapped.

6. The three-dimensional conversion digital file system of claim 5, wherein the processor is further configured to:

generate a plurality of three-dimensional furniture objects with each three-dimensional furniture object positioned at a corresponding spatial location associated with corresponding spatial coordinates included in the three-dimensional virtual environment, wherein the plurality of three-dimensional furniture objects provide a plurality of positions for each three-dimensional object to be positioned on;

map each three-dimensional furniture object to a corresponding set of spatial coordinates included in the three-dimensional virtual environment with each spatial coordinate identifying a corresponding spatial location in the three-dimensional virtual environment; and spatially position each three-dimensional furniture object at each corresponding spatial location in the three-dimensional virtual environment based on the corresponding spatial coordinates included in the three-dimensional virtual environment that each corresponding three-dimensional furniture object is mapped.

7. The three-dimensional conversion digital file system of claim 6, wherein the processor is further configured to:

determine a three-dimensional furniture object that the digital file is to be positioned in the three-dimensional virtual environment;

transform the digital file into the three-dimensional object based on a plurality of furniture object parameters associated with the corresponding three-dimensional furniture object that the digital file is determined to be positioned in the three-dimensional virtual environment, wherein the furniture object parameters are specific to the three-dimensional furniture object that the furniture object parameters are associated;

spatially position the three-dimensional object at spatial location in the three-dimensional virtual environment that the determined three-dimensional furniture object is mapped based on the furniture object parameters of the determined three-dimensional furniture object.

8. The three-dimensional conversion digital file system of claim 7, wherein the processor is further configured to:

automatically select each digital file stored in a specified digital storage medium in the plurality of file formats;

automatically determine each corresponding three-dimensional furniture object that each corresponding digital file is to be positioned in the three-dimensional virtual environment;

transform each digital file stored in the specific digital storage medium in each corresponding file format to a corresponding three-dimensional object based on the furniture object parameters associated with the corresponding three-dimensional furniture object that each corresponding digital file is determined to be positioned; and spatially position each corresponding three-dimensional object at a corresponding spatial location in the three-dimensional virtual environment that the corresponding determined three-dimensional furniture object is mapped based on the corresponding furniture object parameters of the corresponding determined three-dimensional furniture object.

9. The three-dimensional conversion digital file system of claim 8, wherein the processor is further configured to:

transform the digital file into the three-dimensional object based on metadata embedded in the digital file and associated with the digital file parameters, wherein the metadata associated with the digital file parameters is indicative as to a visual representation of the digital file when executed by the computing device; and spatially position the three-dimensional object at the spatial location in the three-dimensional virtual environment based on the metadata associated with the digital file parameters of the digital file.

10. The three-dimensional conversion digital file system of claim 9, wherein the processor is further configured to:

transform the digital file into the three-dimensional object based on the metadata embedded in the determined three-dimensional furniture object and associated with the furniture object parameters, wherein the metadata associated with the furniture object parameters are specific to the three-dimensional furniture object that the furniture object parameters are associated; and spatially positon the three-dimensional object at the spatial location in the three-dimensional virtual environment based on the metadata associated with the furniture object parameters embedded in the determined three-dimensional furniture object.

11. A method for transforming a digital file into a three-dimensional object that is spatially positioned in a three-dimensional virtual environment to visually organize the digital file relative to the three-dimensional virtual environment, comprising:

receiving the digital file that includes a plurality of digital file parameters and is in a file format that is encoded for storage in a two-dimensional hierarchy of file folders of a digital storage medium that the digital file is previously stored, wherein the digital file parameters are indicative as to a visual representation of the digital file when executed by a computing device;

transforming the digital file into the three-dimensional object based on the digital file parameters associated with the digital file thereby providing a user with a visual context of content included in the digital file when executed by the computing device based on a plurality of visual characteristics of the transformed three-dimensional object, wherein the plurality of visual characteristics is displayed by the three-dimensional object that provides the visual context of the content included in the digital file to the user when executed by the computing device;

identifying a spatial position of the three-dimensional object at a spatial location in the three-dimensional virtual environment based on the digital file parameters of the digital file thereby providing the user with a visual context of a location of the digital file within the three-dimensional virtual environment as transformed into the three-dimensional object relative to a plurality of digital files positioned within the three-dimensional virtual environment as transformed into a plurality of three-dimensional objects, spatially positioning the three-dimensional object at the spatial location in the three-dimensional virtual environment based on a plurality of spatial coordinates of the three-dimensional virtual environment thereby identifying the spatial location in the three-dimensional virtual environment that provides the visual context of the location of the digital file as transformed into the three-dimensional object within the three-dimensional virtual environment relative to the plurality of digital files transformed into the plurality of three-dimensional objects; and enabling the user to engage the three-dimensional object as spatially positioned in the three-dimensional virtual environment as requested by the user so that the three-dimensional object is executed in the three-dimensional virtual environment, wherein execution of the digital file by the computing device is transferred to execution of the three-dimensional object in the three-dimensional virtual environment.

12. The method of claim 11, further comprising:

transforming the digital file into the three-dimensional object based on a plurality of content parameters that is indicative as to content included in the digital file when executed by the computing device, wherein the three-dimensional object is representative of the content of the digital file when executed by the computing device; and spatially positioning the three-dimensional object at a spatial location in the three-dimensional virtual environment based on the content parameters of the digital file.

13. The method of claim 11, wherein the receiving the digital file comprises:

enabling the user to browse a plurality of digital files with each of the digital files stored in a plurality of digital storage mediums in a plurality of file formats and select each digital file stored in each corresponding digital storage medium in each corresponding file format;

transforming each selected digital file as stored in each corresponding digital storage medium in each corresponding file format to a corresponding three-dimensional object based on the corresponding digital file parameters associated with each corresponding selected digital file; and spatially positioning each corresponding three-dimensional object at a corresponding spatial location in the three-dimensional virtual environment based on the corresponding digital file parameters of each corresponding selected digital file.

14. The method of claim 13, wherein the receiving the digital file further comprises:

automatically selecting each digital file stored in a specified digital storage medium in the plurality of file formats;

transforming each digital file stored in the specified digital storage medium in each corresponding file format to a corresponding three-dimensional object based on the corresponding digital file parameters associated with each digital file stored on the specified digital storage medium; and spatially positioning each corresponding three-dimensional object at a corresponding spatial location in the three-dimensional virtual environment based on the corresponding digital file parameters of each corresponding digital file stored in the specified storage medium.

15. The method of claim 14, further comprising:

generating the three-dimensional virtual environment that includes a plurality of dimensions that maps out visual representation of the three-dimensional virtual environment as displayed to the user, wherein the three-dimensional virtual environment includes a plurality of spatial coordinates with each spatial coordinate identifying a corresponding spatial location in the three-dimensional virtual environment;

mapping each three-dimensional object that is generated from each corresponding digital file based on the digital file parameters associated with the digital file to a corresponding set of spatial coordinates included in the three-dimensional virtual environment; and spatially positioning each three-dimensional object at each corresponding spatial location in the three-dimensional virtual environment based on the corresponding spatial coordinates included in the three-dimensional virtual environment that each corresponding three-dimensional object is mapped.

16. The method of claim 15, further comprising:

generating a plurality of three-dimensional furniture objects with each three-dimensional furniture object positioned at a corresponding spatial location associated with corresponding spatial coordinates included in the three-dimensional virtual environment, wherein the plurality of three-dimensional furniture objects provide a plurality of positions for each three-dimensional object to be positioned on;

mapping each three-dimensional furniture object to a corresponding set of spatial coordinates included in the three-dimensional virtual environment with each spatial coordinate identifying a corresponding spatial location in the three-dimensional virtual environment; and spatially positioning each three-dimensional furniture object at each corresponding spatial location in the three-dimensional virtual environment based on the corresponding spatial coordinates included in the three-dimensional virtual environment that each corresponding three-dimensional furniture object is mapped.

17. The method of claim 16, further comprising:

determining a three-dimensional furniture object that the digital file is to be positioned in the three-dimensional virtual environment;

transforming the digital file into the three-dimensional object based on a plurality of furniture object parameters associated with the corresponding three-dimensional furniture object that the digital file is determined to be positioned in the three-dimensional virtual environment, wherein the furniture object parameters are specific to the three-dimensional furniture object that the furniture object parameters are associated; and spatially positioning the three-dimensional object at the spatial location in the three-dimensional virtual environment that the determined three-dimensional furniture object is mapped based on the furniture object parameters of the determined three-dimensional furniture object.

18. The method of claim 17, further comprising:

automatically selecting each digital file stored in a specified digital storage medium in the plurality of file formats;

automatically determining each corresponding three-dimensional furniture object that each corresponding digital file is to be positioned in the three-dimensional virtual environment;

transforming each digital file stored in the specific digital storage medium in each corresponding file format to a corresponding three-dimensional object based on the furniture object parameters associated with the corresponding three-dimensional furniture object that each corresponding digital file is determined to be positioned; and spatially positioning each corresponding three-dimensional object at a corresponding spatial location in the three-dimensional virtual environment that the corresponding determined three-dimensional furniture object is mapped based on the corresponding furniture object parameters of the corresponding determined three-dimensional furniture object.

19. The method of claim 18, further comprising:

transforming the digital file into the three-dimensional object based on metadata embedded in the digital file and associated with the digital file parameters, wherein the metadata associated with the digital file parameters is indicative as to the visual representation of the digital file when executed by the computing device; and spatially positioning the three-dimensional object at the spatial location in the three-dimensional virtual environment based on the metadata associated with the digital file parameters of the digital file.

20. The method of claim 19, further comprising:

transforming the digital file into the three-dimensional object based on the metadata embedded in the determined three-dimensional furniture object and associated with the furniture object parameters, wherein the metadata associated with the furniture object parameters are specific to the three-dimensional furniture object that the furniture object parameters are associated; and spatially positioning the three-dimensional object at the spatial location in the three-dimensional virtual environment based on the metadata associated with the furniture object parameters embedded in the determined three-dimensional furniture object.

\* \* \* \* \*